(12) United States Patent
Chouket et al.

(10) Patent No.: US 12,504,374 B2
(45) Date of Patent: Dec. 23, 2025

(54) METHOD FOR DETECTING A REVERSIBLY PHOTOSWITCHABLE CHEMICAL SPECIES IN A SAMPLE

(71) Applicants: CENTRE NATIONAL DE LA RECHERCHE SCIENTIFIQUE, Paris (FR); ECOLE NORMALE SUPERIEURE DE PARIS, Paris (FR); SORBONNE UNIVERSITE, Paris (FR)

(72) Inventors: Raja Chouket, Paris (FR); Vincent Croquette, Antony (FR); Agathe Espagne, Montrouge (FR); Ludovic Jullien, Arcueil (FR); Annie Lemarchand, Villemoisson sur Orge (FR); Thomas Le Saux, Puteaux (FR); Agnès Pellissier-Tanon, Saint-Cloud (FR); Ruikang Zhang, Paris (FR)

(73) Assignees: CENTRE NATIONAL DE LA RECHERCHE SCIENTIFIQUE, Paris (FR); ECOLE NORMALE SUPERIEURE DE PARIS, Paris (FR); SORBONNE UNIVERSITE, Paris (FR)

( * ) Notice: Subject to any disclaimer, the term of this patent is extended or adjusted under 35 U.S.C. 154(b) by 819 days.

(21) Appl. No.: 17/784,639

(22) PCT Filed: Nov. 27, 2020

(86) PCT No.: PCT/EP2020/083570
§ 371 (c)(1),
(2) Date: Jun. 11, 2022

(87) PCT Pub. No.: WO2021/121898
PCT Pub. Date: Jun. 24, 2021

(65) Prior Publication Data
US 2023/0028605 A1   Jan. 26, 2023

(30) Foreign Application Priority Data

Dec. 17, 2019 (EP) .................................. 19306658

(51) Int. Cl.
*G01N 21/64* (2006.01)
(52) U.S. Cl.
CPC ..... *G01N 21/6428* (2013.01); *G01N 21/6408* (2013.01); *G01N 21/6458* (2013.01);
(Continued)
(58) Field of Classification Search
CPC ... G01N 2021/6419; G01N 2021/6441; G01N 21/6408; G01N 21/6428; G01N 21/6458;
(Continued)

(56) References Cited

U.S. PATENT DOCUMENTS

2016/0356716 A1   12/2016   Jullien et al.
2019/0212268 A1*   7/2019   Querard ............. G01N 21/6458

FOREIGN PATENT DOCUMENTS

EP    3795982 A1 *   3/2021  ........... G01N 21/272
JP    2003500094 A     1/2003
(Continued)

OTHER PUBLICATIONS

Rowe, et al., "Elimination of Fluorescence and Scattering Backgrounds in Luminescence Lifetime Measurements Using Gated-Phase Fluorometry", Anal. Chem., vol. 74, No. 18, pp. 4821-4827, 2002.
(Continued)

*Primary Examiner* — Jennifer Wecker
(74) *Attorney, Agent, or Firm* — HAUPTMAN HAM, LLP

(57) ABSTRACT

A method for detecting a reversibly photoswitchable chemical species in a sample, includes the steps of: a) illuminating the sample with light suitable to be absorbed by the chemical
(Continued)

species triggering a reaction affecting an optical property of the chemical species, the first light being periodically-modulated at a fundamental modulation frequency; b) measuring the evolution of the optical property; c) extracting at least one of an in-phase component at a frequency which is an even multiple of the fundamental modulation frequency; and a quadrature component at a frequency which is an odd multiple of the fundamental modulation frequency of a signal representing the evolution; and d) using the extracted component or components for detecting the chemical species. An apparatus for carrying out the method is also provided.

15 Claims, 22 Drawing Sheets

(52) U.S. Cl.
CPC ............... *G01N 2021/6419* (2013.01); *G01N 2021/6441* (2013.01)

(58) Field of Classification Search
CPC ............ G06K 15/181; G06K 15/1848; G06K 15/1851; G06K 15/1868; G06V 30/40; G06T 2207/20021; G06T 2207/20072; G06T 7/12; G06T 7/13
See application file for complete search history.

(56) References Cited

FOREIGN PATENT DOCUMENTS

| WO | 0071028 A1 | 11/2000 |
|---|---|---|
| WO | 2015/075209 A1 | 5/2015 |
| WO | 2018/041588 A1 | 3/2018 |

OTHER PUBLICATIONS

Jenkins, et al., "Toward the measurement of multiple fluorescence lifetimes in flow cytometry: maximizing multi-harmonic content from cells and microspheres", J Biophotonics, vol. 8, No. 11-12, pp. 908-917, Nov. 2015.

Querard, et al., "Expanding discriminative dimensions for analysis and imaging", Chem Sci., vol. 6, No. 5, pp. 2968-2978, 2015.

Querard, et al., "Expanding discriminative dimensions for analysis and imaging", Electronic Supplementary Material (ESI) for Chemical Science, 2015.

Lakowicz, et al., "Fluorescence lifetime imaging", Analytical Biochemistry, vol. 202, Issue 2, pp. 316-330, 1992.

Marriott, et al., "Optical lock-in detection imaging microscopy for contrast-enhanced imaging in living cells", PNAS, vol. 105, No. 46, pp. 17789-17794, 2008.

Richards, et al., "Synchronously Amplified Fluorescence Image Recovery (SAFIRe)", J. Phys. Chem. B, vol. 114, No. 1, pp. 660-665, 2010.

Widengren, "Fluorescence-based transient state monitoring for biomolecular spectroscopy and imaging", J. R. Soc. Interface, vol. 7, pp. 1135-1144, 2010.

Querard, et al., "Photoswitching Kinetics and Phase-Sensitive Detection Add Discriminative Dimensions for Selective Fluorescence Imaging", Angew. Chem., pp. 2633-2637, 2015.

Querard, et al., "Resonant out-of-phase fluorescence microscopy and remote imaging overcome spectral limitations", Nature Communications, vol. 8, Article No. 969, 2017.

\* cited by examiner

METHOD FOR DETECTING A REVERSIBLY PHOTOSWITCHABLE CHEMICAL SPECIES IN A SAMPLE

CROSS-REFERENCE TO RELATED APPLICATIONS

This application is a National Stage of International patent application PCT/EP2020/083570, filed on Nov. 27, 2020, which claims priority to foreign European patent application No. EP 19306658.6, filed on Dec. 17, 2019, the disclosures of which are incorporated by reference in their entirety.

The invention relates to a method for detecting a reversibly photoswitchable chemical species—e.g. a reversibly photoswitchable fluorescent protein (RSFP)—in a sample, and/or for identifying it by discriminating it between several photochemical active species present, or suitable to be present, in the sample. The inventive method also lends itself to different other applications, such as localizing reversibly photoswitchable chemical species in an observed region, provided that a suitable inhomogeneous illumination is used, and determining the composition of a mixture of reversibly photoswitchable chemical species.

Such a method applies, in particular, to the fields of fluorescence microscopy and biological/biochemical analysis.

The invention also relates to an apparatus for carrying out such a method.

The term "chemical species" is understood to mean a molecule, a molecular ion or a complex. Within the framework of the invention, a chemical species is defined by its—notably photochemical—properties. Therefore, a same molecule, molecular ion or complex in a different environment affecting these properties may be considered as a different species.

A "photochemically active" species is a chemical species which undergoes a change of electronic configuration and/or chemical structure under the effects of light. For instance, fluorescent molecules are considered to be photochemically active.

The expression "reversibly photoswitchable" is understood to mean a chemical species (typically a protein) that has at least two distinct states having different properties (e.g. fluorescence properties) and that may be made to reversibly pass from one state to the other under the effect of light. Examples of reversibly photoswitchable species are "Dronpa" and the complex "Spinach-DFHBI" ("Spinach" being an RNA aptamer and DFHBI a fluorogenic probe). These species may in particular be used as labels or markers.

Fluorescence imaging, and particularly fluorescence microscopy, has become essential for biology in view of the high sensitivity and versatility of fluorescent labels. The common approach to identify and discriminate fluorescent labels is to read out the fluorescence signal in the spectral domain. Yet spectral discrimination exhibits limitations for highly multiplexed observations. Even with a rich hardware of light sources, optics corrected for chromatic aberration, dichroic mirrors, optical filters, etc., spectral analysis of overlapping absorption and emission bands can routinely discriminate a maximum of four labels.

Since the optimization of fluorophores (cross section for light absorption, quantum yield of luminescence, half-width of absorption/emission bands) has essentially reached its physical limits and fluorescence should remain a much favored observable for imaging live cells, it is highly desirable to complement the spectral dimension by one or more additional dimensions for further discriminating fluorophores. And indeed several techniques have been developed to discriminate fluorophores using dynamical—i.e. temporal—information characterizing their absorption-fluorescence emission photocycles.

For instance, in Fluorescence Lifetime Imaging Microscopy (FLIM), the lifetimes of excited states have been exploited to distinguish fluorophores ([Lakowicz 1992]). However, beyond requiring sophisticated instruments and fast electronics, this technique is limited by the narrow lifetime dispersion (over less than an order of magnitude) of the bright fluorophores currently used in fluorescence imaging. Hence multiplexed fluorescence lifetime imaging has necessitated deconvolutions (which take time) or the adoption of subtractive schemes (which lack robustness and decrease the signal-to-noise ratio).

Reversibly photoswitchable fluorophores (RSFs—of which RSFPs are a subclass) do not suffer from this drawback. These labels benefit from a rich photochemistry, which goes much beyond the absorption-fluorescence emission photocycle. In RSFs, illumination drives several photocycles including photochemical and thermal steps, which intervene over a wide palette of relaxation times ($\mu$s to s) so as to facilitate discrimination at timescales compatible with real time observations of biological phenomena. Hence several protocols such as OLID, SAFIRe, TRAST, OPIOM and Speed OPIOM have exploited the time response of the fluorescence to light variations for imaging spectrally similar RSFs ("dynamic contrast") by relying on neither deconvolution nor subtraction schemes.

OLID, the acronym for "Optical Lock-In Detection", is described in [Marriott 2008]. One drawback with this technique is that it does not provide quantitative information on the concentration of the RSF. Also, it requires at least one reference pixel.

SAFIRe, the acronym for "Synchronously Amplified Fluorescence Image Recovery", is described in [Richards 2010]. The optimization of the dynamic contrast has the drawback of being done empirically, which introduces an additional implementation complexity.

TRAST is the acronym for TRAnsient STate imaging microscopy. It is described in [Widengren 2010].

OPIOM is the acronym for "Out-of-Phase Imaging after Optical Modulation". This method is described in [Querard 2015] and in WO 2015075209. In this method, a sample containing a RSF is illuminated with a periodically modulated light wave. It has been shown that the component of the fluorescence intensity emitted by the fluorophores at the same frequency and in phase quadrature with respect to the excitation wave exhibits a resonant behavior, i.e. the fluorescence intensity exhibits a peak for particular, species-dependent, values of the illumination intensity and modulation frequency.

Speed OPIOM ([Querard 2017] and WO2018/041588) is a variant of OPIOM which achieves shorter acquisition times thanks to the use of two-wavelength illumination. Speed OPIOM has allowed independently imaging three spectrally similar RSFPs at an acquisition frequency of the order of one Hz.

[Rowe 2002] and [Jenkins 2015] describe improvements of the phase fluorometry technique using a square-wave illumination. Phase shifts and/or modulation factors of several harmonics component of a fluorescence signal are used for determining fluorescence lifetimes.

The invention aims at providing an improved detection method exploiting dynamic contrast and showing better discrimination of spectrally similar RSFs, as well as improved rejection of spectral interferences, compared to OPIOM and Speed OPIOM. The invention, moreover, is not limited to the case of fluorescent molecules and fluorescence detection: it can be applied to any reversibly photoswitchable species having different measurable properties, or "observables" (e.g. fluorescence emission, but also optical absorption, Raman signal, etc.) in its different states. It makes also possible to combine different observables.

According to the invention, this aim is achieved by a method which differs from OPIOM and Speed OPIOM by the fact that it takes into account harmonic components of the detected signal (e.g. fluorescence signal). Otherwise stated, while in both OPIOM and Speed OPIOM only the quadrature part of the "fundamental" component of the detected signal (i.e. the component at the same frequency as the excitation wave) is exploited, the inventive method discriminates reversibly photoswitchable species using harmonic components of the signal, in addition to or in replacement of the fundamental component. Harmonic components are Fourier components of the signal having a frequency which is an integer multiple of the frequency of the excitation wave (a constant, i.e. zero-frequency component and the fundamental component itself are not considered to be harmonics).

More precisely, the invention exploits the quadrature components of the odd harmonics and/or the in-phase components of the even harmonics, because these components show a resonant behavior, which is not the case for the in-phase components of the odd harmonics and the quadrature components of the even harmonics.

An object of the invention is then a method for detecting a reversibly photoswitchable chemical species in a sample, comprising the steps of:
a) illuminating the sample with a first light at a first wavelength suitable to be absorbed by the chemical species triggering a reaction affecting at least one optical property of the chemical species, said first light being periodically-modulated at a fundamental modulation frequency; and
b) measuring the evolution of the optical property of the chemical species;
characterized in that it further comprises the steps of:
c) extracting at least one of:
an in-phase component at a frequency which is an even multiple, different from zero, of the fundamental modulation frequency; and
a quadrature component at a frequency which is an odd multiple of the fundamental modulation frequency, greater than the fundamental modulation frequency itself,
of a signal representing said evolution; and
d) using the extracted component or components for detecting the chemical species.

Another object of the invention is an apparatus for carrying out such a method, comprising:
at least a first controlled light source configured for illuminating a sample with a first light at a first wavelength, said first light being periodically-modulated at a fundamental modulation frequency;
a light detector configured for measuring the evolution of an optical property of the sample; and
a data processing device;
characterized in that the data processing device is configured for extracting at least one of an in-phase component at a frequency which is an even multiple, different from zero, of the fundamental modulation frequency and a quadrature component at a frequency which is an odd multiple, greater than the fundamental modulation frequency itself, of the fundamental modulation frequency of a signal representing said evolution; and for using the extracted component or components for detecting a chemical species in the sample.

Particular embodiments of the method and of the apparatus constitute the subject-matter of the dependent claims.

Additional features and advantages of the present invention will become apparent from the subsequent description, taken in conjunction with the accompanying drawings, wherein.

Figure 8:
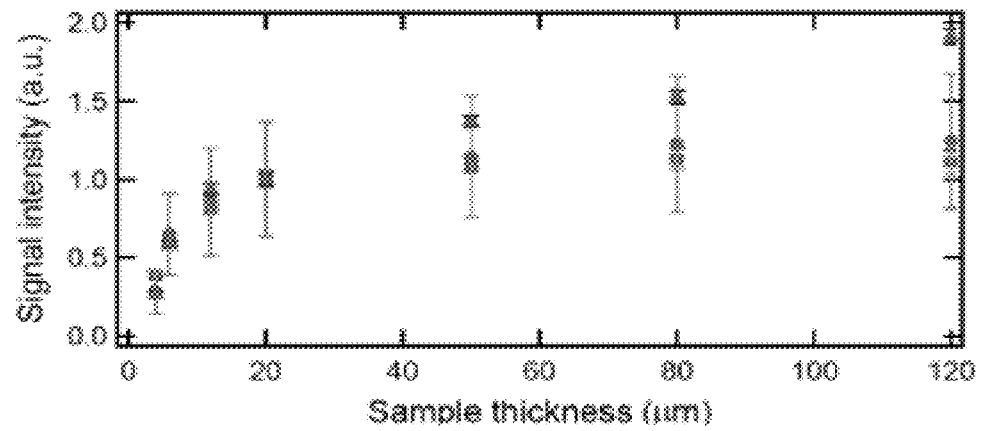
Figure 9:
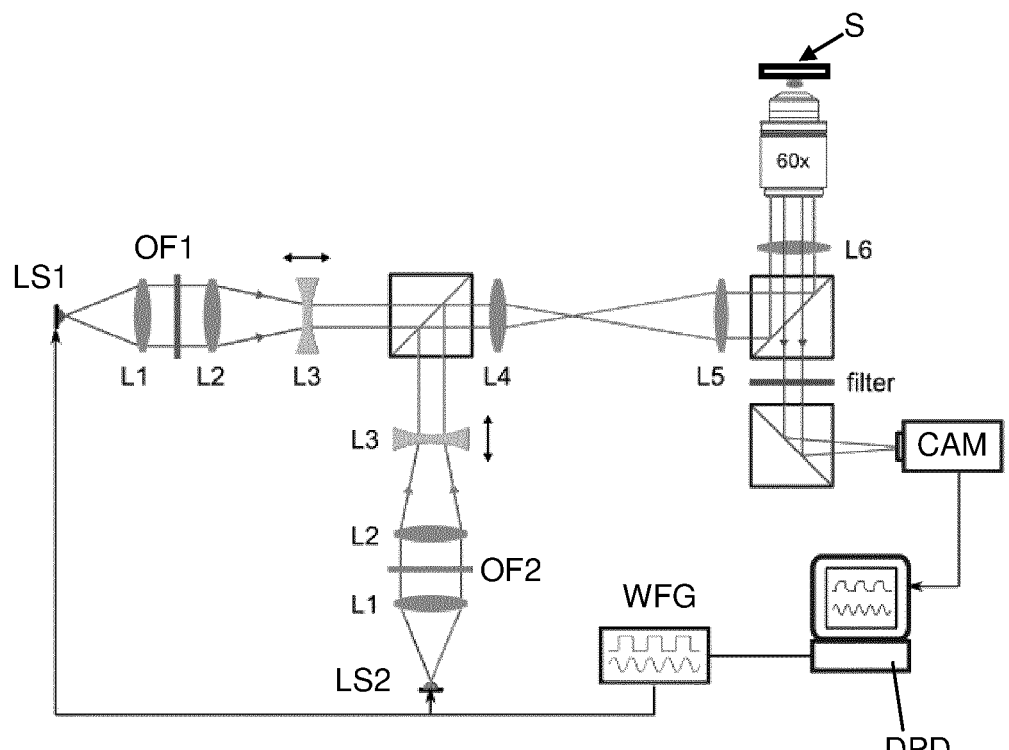
Figure 10:
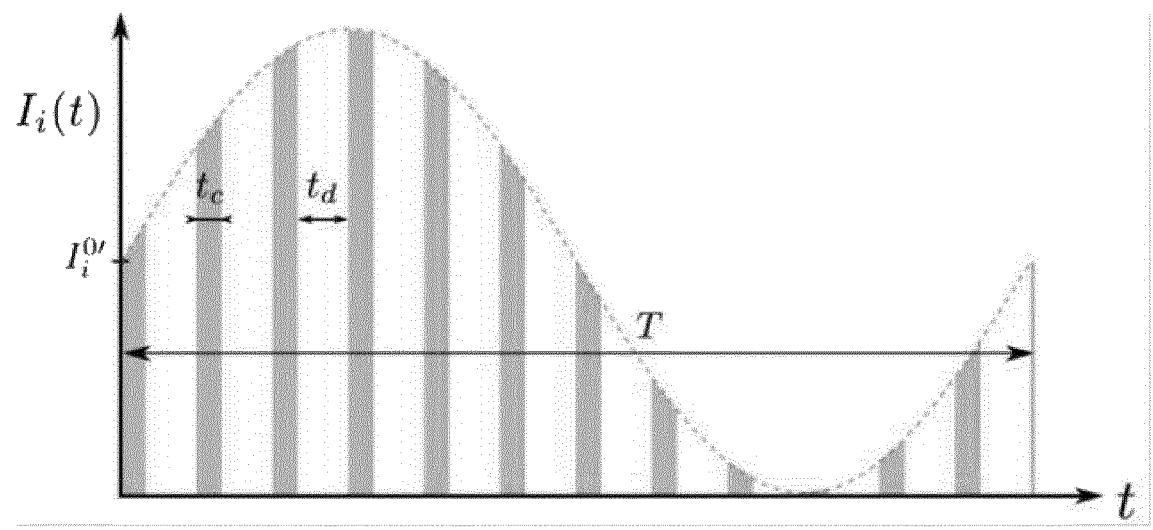
Figure 11:
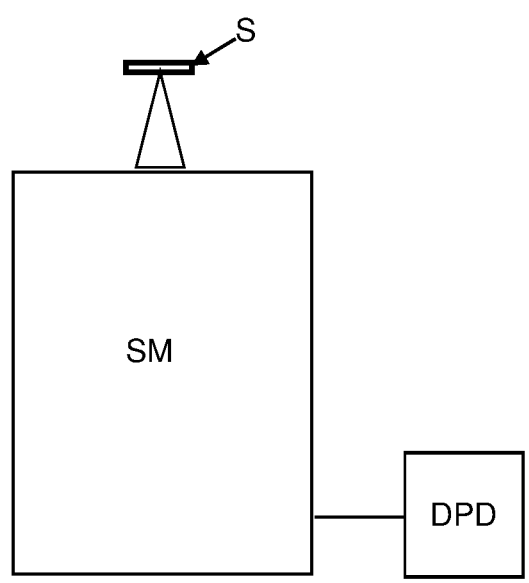

FIGS. 4A-4F, 5A-5F, 6A-6F, and 7A-7I illustrate the discriminatory power of the inventive method;

FIG. 8 demonstrates the inherent optical sectioning power of the inventive method;

FIG. 9 is a schematic representation of an apparatus according to an embodiment of the invention;

FIG. 10 illustrates the light modulation scheme used in some embodiments of the invention; and FIG. 11 is a schematic representation of an apparatus according to another embodiment of the invention.

On FIGS. 2A-2L, respectively associated to positive and negative values, the isodensity curves 95% (thick solid lines), 50% (medium solid lines), 10% (thin solid lines), 0% (dotted lines), −10% (thin dashed lines), −50% (medium dashed lines), −95% (thick dashed lines) refer to absolute extrema.

On FIGS. 3A-6F, respectively associated to positive and negative values, the isodensity curves 95% (solid lines), 50% (solid lines), 10% (solid lines), 0% (dotted lines), −10% (dashed lines), −50% (dashed lines), −95% (dashed lines) refer to absolute extrema.

The inventive method will now be described with reference to the case where the detected chemical species are reversibly photoswitchable fluorophores, however—as explained above—it also applies to non-fluorescent reversibly photoswitchable species, provided that they have different measurable properties (e.g. fluorescence emission, but also optical absorption, Raman signal, etc.) in their different states.

Figure 1:
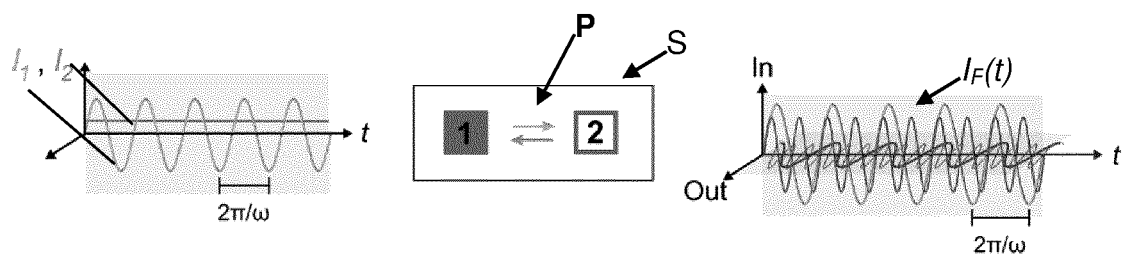
FIG. 1 illustrates the principle at the basis of the invention.

FIG. 1 illustrates the general principle at the basis of the invention. A sample S contains a reversibly photoswitchable species ("label") P which, under the effect of light, can switch between a first state 1 and a second state 2 having different brightness (central part of the figure). In the example of FIG. 1 (see the left part of the figure), the sample is illuminated at a first wavelength $\lambda_1$ with a sinusoidally-modulated light intensity $I_1$ and, simultaneously, at a second wavelength $\lambda_2$ with a constant light intensity $I_2$ (alternatively, $I_2$ could be zero, or be sinusoidally modulated at the same frequency as $I_1$ but in phase opposition; moreover, light may be modulated periodically but not sinusoidally, e.g. by a square wave). In general, the intensity of the fluorescence emission varies periodically, but not sinusoidally; it can therefore be decomposed into harmonic components. More precisely, for each harmonic order there is an "in-phase" component In exhibiting the phase of the exciting light and an "out-of-phase" component Out exhibiting a 90° phase delay with respect to the exciting light. The amplitudes of the harmonic components may be computed e.g. by Fourier-transforming the detected intensity $I_F(t)$ of the fluorescence emission. The harmonics decomposition of the fluorescence emission is illustrated in the right part of FIG. 1.

A detailed theoretical description of the dynamic behavior of the reversibly photoswitchable fluorescent label P illuminated with light of intensity $I(t)$ involving two components $I_1(t)$ and $I_2(t)$ at wavelengths $\lambda_1$ and $\lambda_2$ will be provided, under the assumption that this dynamic behavior is reliably described by the two-state exchange $$1 \underset{k_{21}(t)}{\overset{k_{12}(t)}{\rightleftharpoons}} 2 \quad (1)$$

where the thermodynamically most stable state 1 is photochemically converted into the thermodynamically less stable state 2 at rate constant $$k_{12}(t)=\sigma_{12,1}I_1(t)+\sigma_{12,2}I_2(t) \quad (2)$$

from which it can relax back to the initial state 1 either by a photochemically- or a thermally-driven process at rate constant $$k_{21}(t)=\sigma_{21,1}I_1(t)+\sigma_{21,2}I_2(t)+k_{21}^{\Delta} \quad (3)$$

where $\sigma_{12,1}I_1(t)$, $\sigma_{12,2}I_2(t)$, $\sigma_{21,1}I_1(t)$, $\sigma_{21,2}I_2(t)$, and $k_{21}^{\Delta}$ respectively provide photochemical and thermal contributions to the rate constants. In that case, the molecular action cross-sections for photoisomerization $\sigma_{12,1}$ and $\sigma_{21,1}$ (at $\lambda_1$), $\sigma_{12,2}$ and $\sigma_{21,2}$ (at $\lambda_2$), and the thermal rate constant $k_{21}^{\Delta}$ fully define the dynamic behavior of the reversibly photoswitchable fluorescent label.

We consider that the system is submitted to a modulation of illumination obeying $$I(t)=I_1^0[1+\alpha_1 h_1(\omega t)]+I_2^0[1+\alpha_2 h_2(\omega t)] \quad (4)$$

where $\alpha_1$ and $h_1(\omega t)$ (respectively $\alpha_2$ and $h_2(\omega t)$) designate the amplitude of the light modulation at the wavelength $\lambda_1$ (respectively $\lambda_2$) and a periodic function with fundamental radial frequency $\omega$ respectively. We assume that the system is either uniformly illuminated or that it can be considered homogeneous at any time of its evolution.

Then we rely on the two-state exchange (1) to write the equation governing the concentration evolution $$\frac{d2}{dt} = k_{12}(t)1 - k_{21}(t)2 \quad (5)$$

with $$1 + 2 = P_{tot} \quad (6)$$

where $P_{tot}$ is the total concentration. The steady value of the concentration 2 is $$2^0 = [K_{12}^0/(1+K_{12}^0)]P_{tot} \quad (7)$$

$$K_{12}^0 = \frac{k_{12}^0}{k_{21}^0}, \quad (8)$$

is the equilibrium constant, and $k_{12}^0$ and $k_{21}^0$ $$k_{12}^0=\sigma_{12,1}I_1^0+\sigma_{12,2}I_2^0 \quad (9)$$

$$k_{21}^0=\sigma_{21,1}I_1^0+\sigma_{21,2}I_2^0+k_{21}^{\Delta}, \quad (10)$$

are the rate constants associated with reaction (1) upon illuminating at light intensities $I_1^0$ and $I_2^0$:
For $$f=(2-2^0)N/(P_{tot}(\alpha_1+\alpha_2)) \quad (11)$$

where N is the number of modulated light components of the illumination (N=1 or 2), the differential equation governing the temporal evolution of the concentrations of 1 and 2 (Eq. (5)) becomes $$\frac{df(\theta x)}{dx} = -f(\theta x) + \quad (12)$$

$$\left[\frac{N}{1+\frac{\alpha_2}{\alpha_1}}\frac{K_{12}^0}{(1+K_{12}^0)^2}\Delta_{12,1}^0 - \alpha_1(\sigma_{12,1}+\sigma_{21,1})I_1^0\tau_{12}^0 f(\theta x)\right]h_1(\theta x) +$$

$$\left[\frac{N\frac{\alpha_2}{\alpha_1}}{1+\frac{\alpha_2}{\alpha_1}}\frac{K_{12}^0}{(1+K_{12}^0)^2}\Delta_{12,2}^0 - \alpha_2(\sigma_{12,2}+\sigma_{21,2})I_2^0\tau_{12}^0 f(\theta x)\right]h_2(\theta x)$$

$$\text{where:} x = \frac{t}{\tau_{12}^0} \quad (13)$$

$$\theta = \omega\tau_{12}^0, \quad (14)$$

with $\tau_{12}^0$ the relaxation time of the reaction (1):

$$\tau_{12}^0 = \frac{1}{k_{12}^0 + k_{21}^0} \quad (15)$$

and $\Delta_{12,1}^0$ (respectively $\Delta_{12,2}^0$) the difference of the relative contributions of the average of the modulated light at wavelength $\lambda_1$ ($I_1^0$) (respectively $\lambda_2$ ($I_2^0$)) to drive the transition from 1 to 2 (respectively from 2 to 1):

$$\Delta_{12,1}^0 = \frac{\sigma_{12,1}I_1^0}{\sigma_{12,1}I_1^0+\sigma_{12,2}I_2^0} - \frac{\sigma_{21,1}I_1^0}{\sigma_{21,1}I_1^0+\sigma_{21,2}I_2^0+k_{21}^{\Delta}} \quad (16)$$

$$\Delta_{12,2}^0 = \frac{\sigma_{12,2}I_2^0}{\sigma_{12,1}I_1^0+\sigma_{12,2}I_2^0} - \frac{\sigma_{21,2}I_2^0}{\sigma_{21,1}I_1^0+\sigma_{21,2}I_2^0+k_{21}^{\Delta}}. \quad (17)$$

This equation is subsequently solved in three distinct cases:
1. Case 1. We first consider the case of reversibly photoswitchable species whose forward and backward conversions are both photochemically driven using two different wavelengths with only one of them ($\lambda_1$) being modulated (N=1, $\alpha_2$=0). In the following, this case is addressed by making the following assumptions validated in most reported systems:
   a. The transition from the state 1 to the state 2 is assumed to be controlled by the illumination at the wavelength $\lambda_1$ ($\sigma_{12,2}I_2^0 \ll \sigma_{12,1}I_1^0$) whereas the transition from the state 2 to the state 1 is driven by the illumination at the wavelength $\lambda_2$ ($\sigma_{21,1}I_1^0 + k_{21}^{\Delta} \ll \sigma_{21,2}I_2^0$), which means that we consider to be in a regime of high enough light intensity $I_2^0$.
   b. The illumination at the wavelength $\lambda_1$ contributes more to the rate constants from the state 1 to the state 2 than from the state 2 to the state 1 ($\sigma_{21,1} \ll \sigma_{12,1}$).
Thus Eqs. (8), (15), and (16) become:

$$K_{12}^{0,a} = \frac{\sigma_{12,1} I_1^0}{\sigma_{21,2} I_2^0} \tag{18}$$

$$\tau_{12}^{0,a} = \frac{1}{\sigma_{12,1} I_1^0 + \sigma_{21,2} I_2^0} \tag{19}$$

$$\Delta_{12,1}^{0,a} = 1 \tag{20}$$

Under the latter assumptions, Eq. (12) yields:

$$\frac{df(\theta x)}{dx} = -f(\theta x) + \left[ \frac{K_{12}^{0,a}}{\left(1 + K_{12}^{0,a}\right)^2} - \alpha_1 \frac{K_{12}^{0,a}}{1 + K_{12}^{0,a}} f(\theta x) \right] h_1(\theta x) \tag{21}$$

2. Case 2. We subsequently consider the case of reversibly photoswitchable species whose forward conversion is photochemically driven, whereas the backward reaction involves thermal control. We correspondingly adopt $I_2^0 = 0$ (N=1, $\alpha_2 = 0$) and rely on reported results to further assume that:
   a. The illumination at the wavelength $\lambda_1$ contributes more to the rate constants from the state 1 to the state 2 than from the state 2 to the state 1 ($\sigma_{21,1} \ll \sigma_{12,1}$).
   b. The transition from the state 2 to the state 1 is driven by the thermal contribution ($k_{21}^{\Delta} \gg \sigma_{21,1} I_1^0$). Thus Eqs. (8), (15), and (16) become:

$$K_{12}^{0,b} = \frac{\sigma_{12,1} I_1^0}{k_{21}^{\Delta}} \tag{22}$$

$$\tau_{12}^{0,b} = \frac{1}{\sigma_{12,1} I_1^0 + k_{21}^{\Delta}} \tag{23}$$

$$\Delta_{12,1}^{0,b} = 1 \tag{24}$$

Under the latter assumptions, Eq. (12) yields:

$$\frac{df(\theta x)}{dx} = -f(\theta x) + \left[ \frac{K_{12}^{0,b}}{\left(1 + K_{12}^{0,b}\right)^2} - \alpha_1 \frac{K_{12}^{0,b}}{1 + K_{12}^{0,b}} f(\theta x) \right] h_1(\theta x) \tag{25}$$

3. Case 3. We eventually consider the case of reversibly photoswitchable species whose forward and backward conversions are both photochemically driven using two different wavelengths which are both modulated (N=2). In addition to the assumptions (a) and (b) of the case 1, we further adopt the following assumptions to address this case:
   a. The illumination at the wavelength $\lambda_2$ contributes more to the rate constants from the state 2 to the state 1 than from the state 1 to the state 2 ($\sigma_{12,1} \ll \sigma_{21,2}$). Thus Eqs (8), (15), (16) and (17) become:

$$K_{12}^{0,c} = \frac{\sigma_{12,1} I_1^0}{\sigma_{21,2} I_2^0} \tag{26}$$

$$\tau_{12}^{0,c} = \frac{1}{\sigma_{12,1} I_1^0 + \sigma_{21,2} I_2^0} \tag{27}$$

$$\Delta_{12,1}^{0,c} = 1 \tag{28}$$

$$\Delta_{12,2}^{0,c} = -1 \tag{29}$$

b. The periodic functions $h_1(\theta x)$ and $h_2(\theta x)$ are opposite ($h_2(\theta x) = -h_1(\theta x)$).

Under the latter assumptions, Eq. (12) yields:

$$\frac{df(\theta x)}{dx} = -f(\theta x) + \left[ \frac{2K_{12}^{0,c}}{\left(1 + K_{12}^{0,c}\right)^2} - \frac{\alpha_1 K_{12}^{0,c} - \alpha_2}{1 + K_{12}^{0,c}} f(\theta x) \right] h_1(\theta x)$$

The final equations (21) and (25) are similar. In the following, we correspondingly adopt the following general equations for the first two cases:

$$\frac{df(\theta x)}{dx} = -f(\theta x) + \left[ \frac{K_{12}^0}{\left(1 + K_{12}^0\right)^2} - \alpha \frac{K_{12}^0}{1 + K_{12}^0} f(\theta x) \right] h(\theta x) \tag{30}$$

and for the third case;

$$\frac{df(\theta x)}{dx} = -f(\theta x) + \left[ \frac{2K_{12}^0}{\left(1 + K_{12}^0\right)^2} - \frac{\alpha_1 K_{12}^0 - \alpha_2}{1 + K_{12}^0} f(\theta x) \right] h(\theta x) \tag{31}$$

Beyond the relaxation time $\tau_{12}^0$, one enters into a permanent regime in which $f(\theta x)$ is a continuous periodic function. Then $f(\theta x)$ can be expressed as a Fourier series $$f(\theta x) = a_0 + \sum_{n=1}^{+\infty} [a_n \cos(n\theta x) + b_n \sin(n\theta x)] \tag{32}$$

where $a_n$ and $b_n$ designate the amplitudes of the n-th components of the Fourier series. The $a_n$ and $b_n$ terms can be extracted from Eqs. (31), (32) upon identifying the amplitudes of the components of the same order (harmonic balance).

Then we obtain the following expressions of the concentrations in 1 and 2:

$$2 = 2^0 + \frac{\alpha_1 + \alpha_2}{N} \left\{ a_0 + \sum_{n=1}^{+\infty} [a_n \cos(n\theta x) + b_n \sin(n\theta x)] \right\} P_{tot} \tag{33}$$

$$1 = 1^0 - \frac{\alpha_1 + \alpha_2}{N} \left\{ a_0 + \sum_{n=1}^{+\infty} [a_n \cos(n\theta x) + b_n \sin(n\theta x)] \right\} P_{tot} \tag{34}$$

The following explicit notations are introduced:

$$2_{norm}^{n,in} = b_n \tag{35}$$

$$2_{norm}^{n,out} = a_n \tag{36}$$

where in means in phase and out in quadrature with light modulation and norm stands for scaling of the amplitudes. $2_{norm}^{n,in}$ and $2_{norm}^{n,out}$ respectively represent the in-phase and the out-of-phase parts of the n-order component of the normalized (with respect to $P_{tot}$) concentration of the 2 state. Similarly, it is possible to define $1_{norm}^{n,in} = -2_{norm}^{n,in}$ and $1_{norm}^{n,out} = -2_{norm}^{n,out}$.

Many observables (e.g. absorbance, electrophoretic mobility, ...) from the photoswitchable probe P vary linearly with the concentrations in 1 and 2. Therefore the harmonic components of the time dependency of these observables are expressed (apart from a proportionality factor) by the equations above for the harmonic components of 1 and 2.

Fluorescence emission, which is a hugely important observable for practical application of the present invention e.g. to biology, has a more complex time dependence:

$$I_F(t)=[Q_{1,1}1(t)]I_1(t)+[Q_{1,2}1(t)+Q_{2,2}2(t)]I_2(t) \quad (37)$$

where $Q_{i,j}$ is the brightness of state I (i=1, 2) when illuminated at wavelength $\lambda_j$ (j=1, 2).

Like concentrations, intensity of fluorescence emission may be decomposed into in-phase and out-of-phase harmonic components:

$$I_F(t)=\mathfrak{I}_\mathfrak{F}^0+\Sigma_{n=1}^\infty[\mathfrak{I}_\mathfrak{F}^{n,in}\ sin(n\theta x)+\mathfrak{I}_\mathfrak{F}^{n,out}\ cos(n\theta x)] \quad (38)$$

As the inventive method uses harmonic components of the fluorescence intensity (or of other observables) to detect and/or discriminate reversibly photoswitchable species, in preferred embodiments of the invention the modulation of the light intensity is sinusoidal, so that no harmonic component is introduced by the linear part of the dynamical response of the species. Hereafter, then, the particular cases of sinusoidal modulation at one or two wavelengths will be considered in detail. The invention, however, is not limited to these preferred cases, and non-sinusoidal light modulation may also be used. A particularly interesting case is that of a square-wave (i.e. on-off) light intensity modulation, which is particularly easy to implement. As the Fourier development of a square wave only comprises odd harmonics, when an on-off light intensity modulation is applied, it is advantageous to perform the detection/identification of the reversibly photoswitchable species by only taking into account even harmonics of the relevant observable(s).

Light intensity sinusoidally modulated at one wavelength can be expressed as:

$$I(t)=I_1^0[1+\alpha\ sin(\omega t)]+I_2^0 \quad (39)$$

Injecting (38) into (30) and then extracting the harmonic components according to (32) allows the numerical calculation of the $a_n$ and $b_n$ terms (amplitudes of the out-of-phase and in-phase harmonic components, n being the harmonic order).

Truncation at the fifth order (n=5) has been found to be sufficient to yield convergence: the dependencies of $a_0$, $a_1$, $b_1$, $a_2$ and $b_2$ do not significantly evolve beyond the third order (n=3), whereas the convergences of $a_3$, $b_3$ and $a_4$, $b_4$ are observed beyond the fourth (n=4) and fifth order (n=5) respectively.

The amplitudes $a_i$ and $b_i$ do not all share the same sign: $a_0$, $a_1$, $b_3$, $a_4$ and $b_4$ are negative whereas $b_1$, $a_2$, $b_2$ and $a_3$ are positive. The odd order out-of-phase ($a_{2k+1}$, with $k\in \mathbb{N}$) and even order in-phase ($b_{2k}$, with $k\in \mathbb{N}$ *) amplitudes exhibit an optimum at coordinates $(k_{12}^{0,R},\theta^R)$ in the $(K_{12}^0,\theta)$ space, whose position shifts respectively toward higher and smaller $K_{12}^0$ and $\theta$ values when k increases; otherwise said, they show a resonant behavior (note that the resonant behavior of the $a_1$ term had already been identified, and is exploited by the OPIOM technique mentioned above).

Moreover, the bandwidth of the resonance decreases, at a larger rate along $\theta$. As it will be discussed further, this allows improving the resolving power of the inventive method compared with the OPIOM technique.

In contrast, the other amplitudes ($a_{2k}$, with $k\in \mathbb{N}$ and $b_{2k+1}$, with $k\in \mathbb{N}$) exhibit a ridge shape; they can be optimized with respect to $K_{12}^0$ but only display a threshold behavior with respect to $\theta$. These components are discarded in preferred embodiments of the inventive method.

Another interesting result is that the intensity of the harmonic components decreases, but rather slowly—roughly by a factor of 2 whenever the order n increases by 1. This means that, in most cases of practical interest, at least the first few harmonics (up to the third or the fourth) will be usable.

The inventors have found the following approximate analytical expressions for the amplitudes of the in-phase even harmonics and of the out-of-phase odd harmonics:

For the out-of-phase components at odd orders: n=2k+1; $k\in \mathbb{N}$:

$$a_{2k+1} = (-1)^{k+1} A_{2k+1}\alpha^{2k} \frac{(K_{12}^0)^{2k+1}}{(1+K_{12}^0)^{2k+2}} \frac{\theta P^k[\theta^2]}{\prod_{i=1}^{2k+1}[1+i^2\theta^2]} \quad (40)$$

For the in-phase components at even orders: n=2k; $k\in \mathfrak{I}_{\mathfrak{F},norm}^{2,in}$ *:

$$b_{2k} = (-1)^{k+1} A_{2k}\alpha^{2k-1} \frac{(K_{12}^0)^{2k}}{(1+K_{12}^0)^{2k+1}} \frac{\theta P^{k-1}[\theta^2]}{\prod_{i=1}^{2k}[1+i^2\theta^2]} \quad (41)$$

where $A_n$ is a positive amplitude factor and $P^n$ a polynomial of order n, with $P^n[\theta^2]\sim 1$ for $\theta \lesssim 1$.

If properties proportional to the concentrations 1 and 2 are used for detecting and/or discriminating photoswitchable species, it is useful to work with normalized observables:

$$O_{j,norm}(t) = \frac{Q_{1,j}1(t)+Q_{2,j}2(t)}{(Q_{2,j}-Q_{1,j})\alpha P_{tot}} \quad (42)$$

where $Q_{1,j}$ and $Q_{2,j}$ designate the specific normalized observables associated to the observation at the wavelength $\lambda_j$ for the states 1 and 2 respectively. Harmonics decomposition gives:

$$O_{j,norm}(t)=\mathfrak{O}_{j,norm}^0+\Sigma_{n=1}^\infty[\mathfrak{O}_{j,norm}^{n,in}\ sin(n\theta x)+\mathfrak{O}_{j,norm}^{n,out}\ cos(n\theta x)] \quad (43)$$

$$\mathfrak{O}_{j,norm}^{n,in}=b_n \quad (44)$$

$$\mathfrak{O}_{j,norm}^{n,out}=a_n \quad (45)$$

Similarly, when the observable used for detecting/identifying reversibly photoswitchable species is fluorescence emission, it is useful to define a normalized fluorescence intensity:

$$I_{F,norm}(t) = \frac{[Q_{1,1}1(t)+Q_{2,1}2(t)]I_1(t)+[Q_{1,2}1(t)+Q_{2,2}2(t)]I_2(t)}{[(Q_{2,1}-Q_{1,1})I_1^0+(Q_{2,2}-Q_{1,2})I_2^0]\alpha P_{tot}} \quad (46)$$

Harmonics decomposition gives:

$$I_{F,norm}(t)=\mathfrak{I}_{\mathfrak{F},norm}^0+\Sigma_{n=1}^\infty[\mathfrak{I}_{\mathfrak{F},norm}^{n,in}\ sin(n\theta x)+\mathfrak{I}_{\mathfrak{F},norm}^{n,out}\ cos(n\theta x)]. \quad (47)$$

with:

$$\mathfrak{I}_{n,norm}^{1,in} = \frac{K_{12}^0[1+Q_{\lambda_1}K_{12}^0]}{[K_{12}^0(Q_{\lambda_1}-1)+\Pi\varsigma(Q_{\lambda_2}-1)](1+K_{12}^0)} + b_1 + \frac{\alpha}{2}\frac{1}{1+\frac{\xi}{K_{12}^0}}(2a_0 - a_2) \quad (48)$$

$$\mathfrak{I}_{n,norm}^{1,out} = a_1 + \frac{\alpha}{2}\frac{1}{1+\frac{\xi}{K_{12}^0}}b_2 \quad (49)$$

$$\mathfrak{I}_{n,norm}^{n,in} = b_n + \frac{\alpha}{2}\frac{1}{1+\frac{\xi}{K_{12}^0}}(a_{n-1} - a_{n+1}) \quad (50)$$

$$\mathfrak{I}_{n,norm}^{n,out} = a_n - \frac{\alpha}{2}\frac{1}{1+\frac{\xi}{K_{12}^0}}(b_{n-1} - b_{n+1}) \quad (51)$$

for $n > 1$, with $\varsigma = \frac{\sigma_{121}}{\sigma_{212}}$, $\Pi = \frac{Q_{1,2}}{Q_{1,1}}$, $\xi = \Pi\varsigma\frac{Q_{\lambda_2}-1}{Q_{\lambda_1}-1}$ and $Q_{\lambda_i} = \frac{Q_{2,i}}{Q_{1,i}}$.

Light intensity sinusoidally modulated at two wavelengths with phase opposition can be expressed as:

$$I(t)=I_1^0[1+\alpha_1\sin(\omega t)]+I_2^0[1-\alpha_2\sin(\omega t)] \quad (52)$$

Injecting (52) into (31) and then extracting the harmonic components according to (32) allows the numerical calculation of the $a_n$ and $b_n$ terms (amplitudes of the out-of-phase and in-phase harmonic components, n being the harmonic order).

Truncation at the fifth order (n=5) has been found to be sufficient to yield convergence: the dependencies of $a_0$, $a_1$, $b_1$, $a_2$ and $b_2$ do not significantly evolve beyond the third order (n=3), whereas the convergences of $a_3$, $b_3$ and $a_4$, $b_4$ are observed beyond the fourth (n=4) and fifth order (n=5) respectively.

The amplitudes $a_i$ and $b_i$ do not all share the same sign: $a_1$ and $b_3$ are negative, $b_1$ and $a_3$ are positive whereas $a_0$, $a_2$, $b_2$, $a_4$ and $b_4$ exhibit positive and negative components. The odd order amplitudes ($a_{2k+1}$ and $b_{2k+k1}$, with $k\in \mathbb{N}$) exhibit a symmetry axis in $K_{12}^0=1$ and the even order amplitudes ($a_{2k}$ $b_{2k}$, with $k\in \mathbb{N}$) exhibit an antisymmetry axis in $K_{12}^0=1$. The odd order out-of-phase ($a_{2k+1}$, with $k\in \mathbb{N}$) and even order in-phase ($b_{2k}$, with $k\in \mathbb{N}*$) amplitudes exhibit at least an optimum in the ($K_{12}^0,\theta$) space. More specifically, $a_1$ exhibits an optimum whereas the superior orders ($a_{2k+1}$ and $b_{2k}$, k>0) exhibit two optima, whose positions shift respectively toward higher and smaller $K_{12}^0$ (symmetry in $K_{12}^0=1$) and smaller $\theta$ values when k increases; otherwise said, they show a resonant behavior (note that the resonant behavior of the $a_1$ term had already been identified, and is exploited by the Speed OPIOM technique mentioned above).

Moreover, the bandwidth of the resonance decreases, at a larger rate along $\theta$. As it will be discussed further, this allows improving the resolving power of the inventive method compared with the OPIOM and Speed OPIOM techniques.

In contrast, the other amplitudes ($a_{2k}$, with $k\in \mathbb{N}$ and $b_{2k+1}$, with $k\in \mathbb{N}$) exhibit at least a ridge shape; $b_1$ exhibits a ridge shape whereas the superior orders ($b_{2k+1}$ and $a_{2k}$, k>0) exhibit two ridge shapes which can be optimized with respect to $K_{12}^0$ but only exhibit a threshold behavior with respect to $\theta$. These components are discarded in preferred embodiments of the inventive method.

With respect to the observations performed in the case of the single light modulation and by restricting analysis to the terms exhibiting at least a resonance:

The evolution of the position and bandwidth of the resonance along the $\theta$ axis is similar;

The position and bandwidth of the resonance along the $K_{12}^0$ axis shift faster when increasing the order n of the concentration terms;

The decrease of the harmonics intensity with increasing harmonic order is similar;

The optimal amplitudes in the ($K_{12}^0,\theta$) space are the same except for $a_1$, which is twice higher.

The inventors have found the following approximate analytical expressions for the amplitudes of the in-phase even harmonics and of the out-of-phase odd harmonics:

For the out-of-phase components at odd orders: n=2k+1; $k\in \mathbb{N}$:

$$a_{2k+1} = (-1)^{k+1}A_{2k+1}\frac{K_{12}^0(\alpha_1 K_{12}^0 - \alpha_2)^{2k}}{(1+K_{12}^0)^{2k+2}}\frac{\theta P^k[\theta^2]}{\prod_{i=1}^{2k+1}[1+i^2\theta^2]} \quad [53]$$

For the in-phase components at even orders: n=2k; $k\in \mathbb{N}*$:

$$b_{2k} = (-1)^{k+1}A_{2k}\frac{K_{12}^0(\alpha_1 K_{12}^0 - \alpha_2)^{2k-1}}{(1+K_{12}^0)^{2k+1}}\frac{\theta P^{k-1}[\theta^2]}{\prod_{i=1}^{2k}[1+i^2\theta^2]} \quad (54)$$

where $A_n$ is a positive amplitude factor and $P^n$ a polynomial of order n, with $P^n[\theta^2]-1$ for $\theta \lesssim 1$.

If properties proportional to the concentrations 1 and 2 are used for detecting and/or discriminating photoswitchable species, it is useful to work with normalized observables:

$$O_{j,norm}(t) = \frac{Q_{1,j}1(t) + Q_{2,j}2(t)}{(Q_{2,j}-Q_{1,j})\frac{\alpha_1+\alpha_2}{2}P_{tot}} \quad (55)$$

where $Q_{1,j}$ and $Q_{2,j}$ designate the specific normalized observables associated to the observation at the wavelength $\lambda_j$ for the states 1 and 2 respectively. Harmonic decomposition gives:

$$O_{j,norm}(t)=\mathfrak{O}_{j,norm}^0 + \Sigma_{n=1}^\infty[\mathfrak{O}_{j,norm}^{n,in}\sin(n\theta x) + \mathfrak{O}_{j,norm}^{n,out}\cos(n\theta x)] \quad (56)$$

$$\mathfrak{O}_{j,norm}^{n,out} = a_n \quad (57)$$

$$\mathfrak{O}_{j,norm}^{n,in} = b_n \quad (58)$$

Similarly, when the observable used for detecting/identifying reversibly photoswitchable species is fluorescence emission, it is useful to define a normalized fluorescence intensity:

$$I_{F,norm}(t) = \frac{[Q_{1,1}1(t)+Q_{2,1}2(t)]I_1(t)+[Q_{1,2}1(t)+Q_{2,2}2(t)]I_2(t)}{[(Q_{2,1}-Q_{1,1})I_1^0+(Q_{2,2}-Q_{1,2})I_2^0]\frac{\alpha_1+\alpha_2}{2}P_{tot}} \quad (59)$$

Harmonic decomposition gives:

$$I_{F,norm}(t) = \Im^0_{\mathfrak{F},norm} + \sum_{n=1}^{\infty} [\Im^{n,in}_{\mathfrak{F},norm}\sin(n\theta x) + \Im^{n,out}_{\mathfrak{F},norm}\cos(n\theta x)] \quad (60)$$

with:

$$\Im^{1,in}_{R,norm} = \frac{2[\alpha_1 K^0_{12}(1+Q_{\lambda_1}K^0_{12}) - \alpha_2 \Pi_\varsigma(1+Q_{\lambda_2}K^0_{12})]}{[K^0_{12}(Q_{\lambda_1}-1)+\Pi_\varsigma(Q_{\lambda_2}-1)](\alpha_1+\alpha_2)(1+K^0_{12})} + \quad (61)$$

$$b_1 + \frac{1}{2}\frac{\alpha_1 - \alpha_2 \frac{\xi}{K^0_{12}}}{1+\frac{\xi}{K^0_{12}}}(2a_0 - a_2)$$

$$\Im^{1,out}_{R,norm} = a_1 + \frac{1}{2}\frac{\alpha_1 - \alpha_2 \frac{\xi}{K^0_{12}}}{1+\frac{\xi}{K^0_{12}}}b_2 \quad (62)$$

$$\Im^{n,in}_{R,norm} = b_n + \frac{1}{2}\frac{\alpha_1 - \alpha_2 \frac{\xi}{K^0_{12}}}{1+\frac{\xi}{K^0_{12}}}(a_{n-1} - a_{n+1}) \quad (63)$$

$$\Im^{n,out}_{R,norm} = a_n - \frac{1}{2}\frac{\alpha_1 - \alpha_2 \frac{\xi}{K^0_{12}}}{1+\frac{\xi}{K^0_{12}}}(b_{n-1} - b_{n+1}) \quad (64)$$

for $n > 1$, with $\varsigma = \frac{\sigma_{121}}{\sigma_{212}}$, $\Pi = \frac{Q_{1,2}}{Q_{1,1}}$, $\xi = \Pi_\varsigma \frac{Q_{\lambda_2} - 1}{Q_{\lambda_1} - 1}$ and $Q_{\lambda_i} = \frac{Q_{2,i}}{Q_{1,i}}$.

Figure 2A:
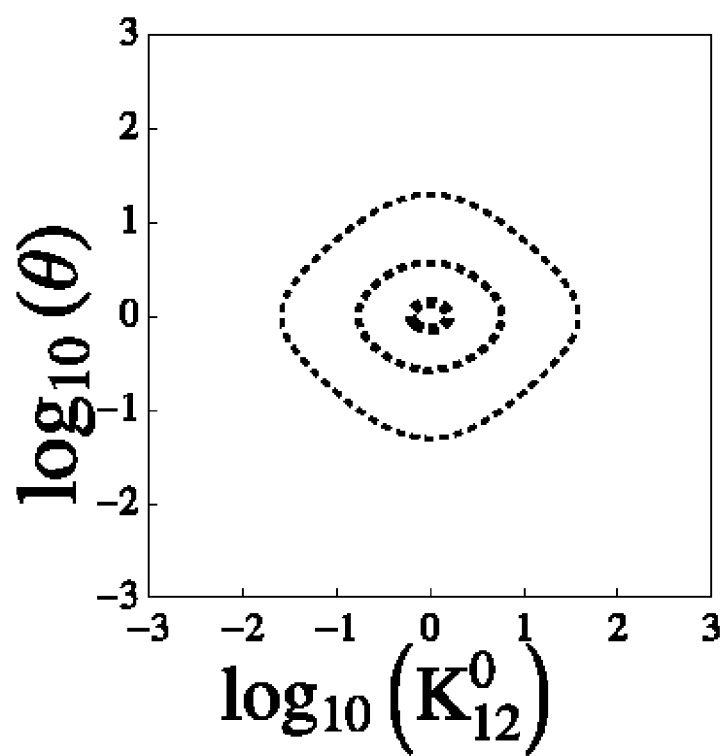
FIGS. 2A-2L show the theoretical dependence of concentrations (2A-2H) and fluorescence intensities (2I-2L) on dimensionless light intensity and modulation frequency.
Figure 2B:
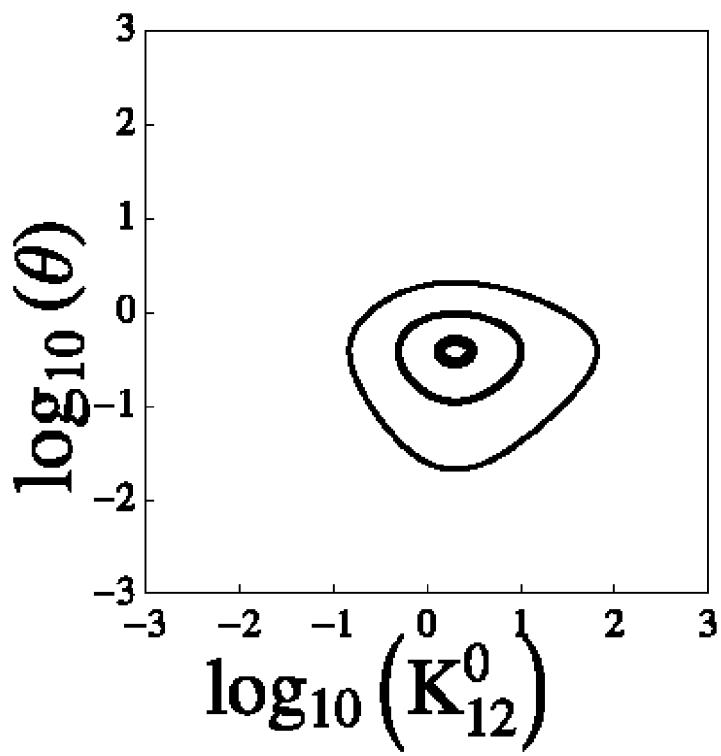
Figure 2C:
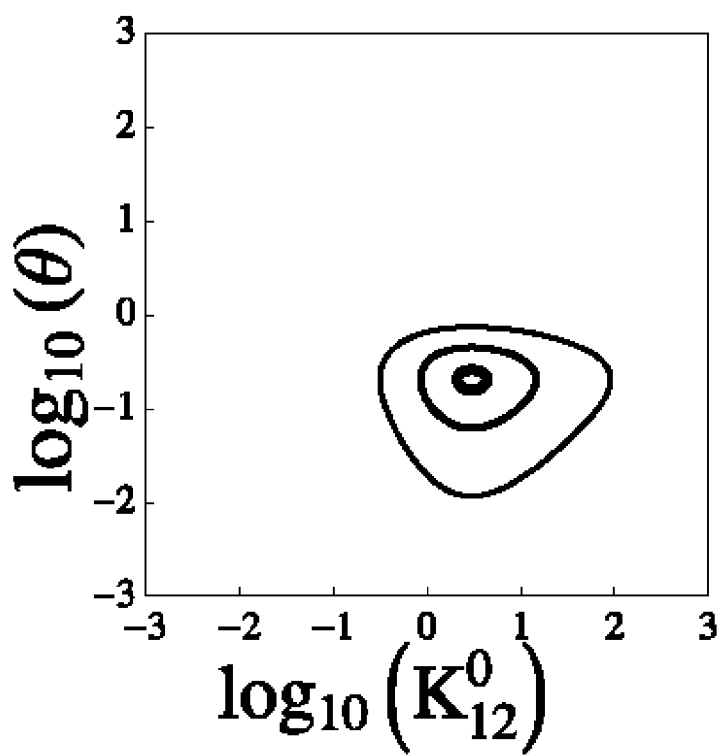
Figure 2D:
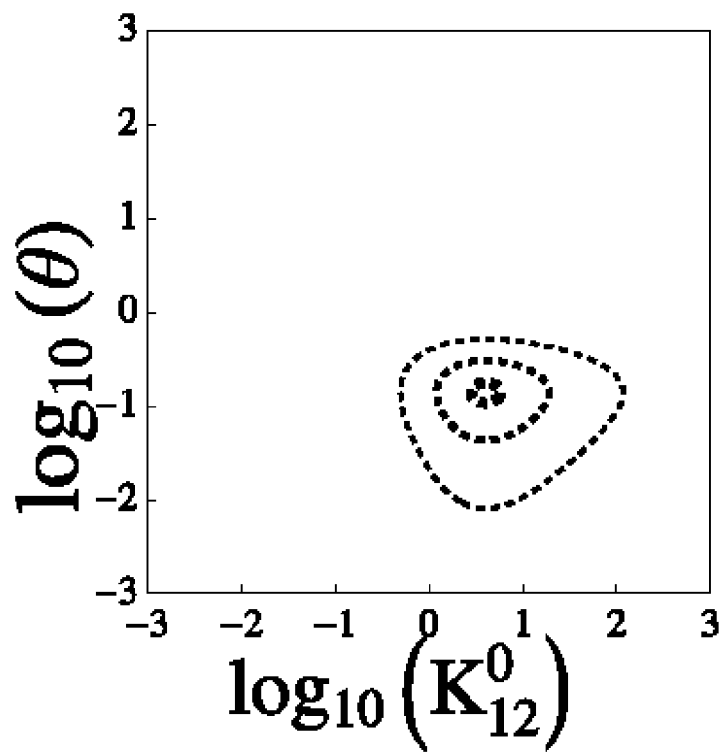
Figure 2E:
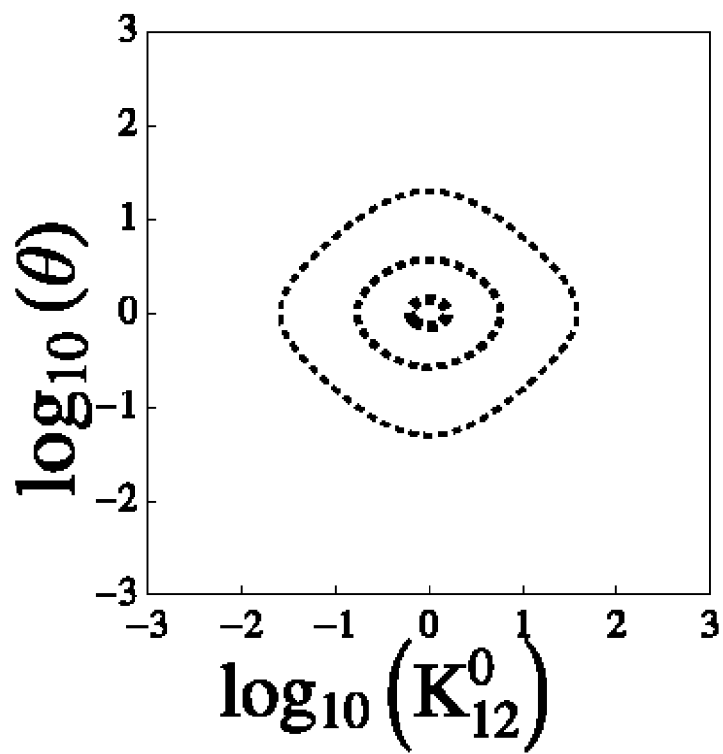
Figure 2F:
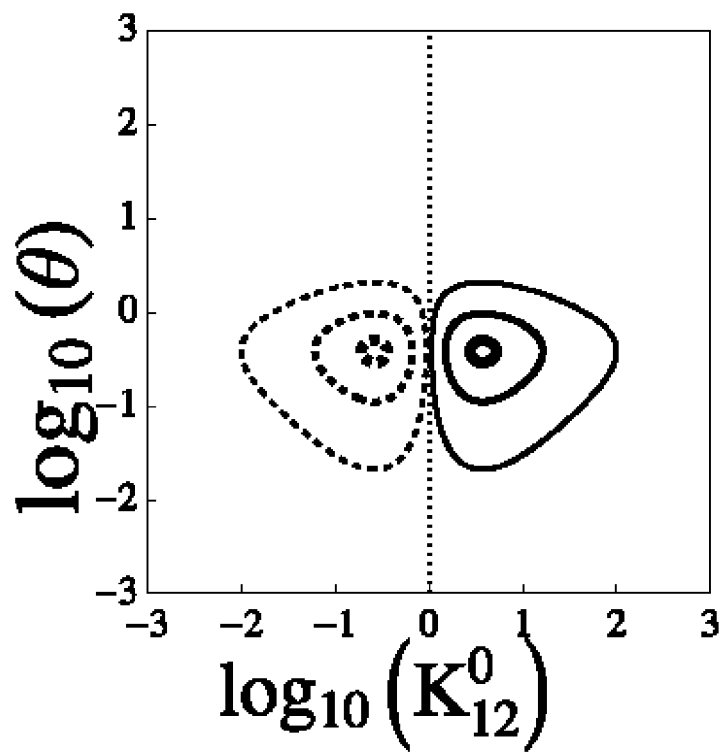
Figure 2G:
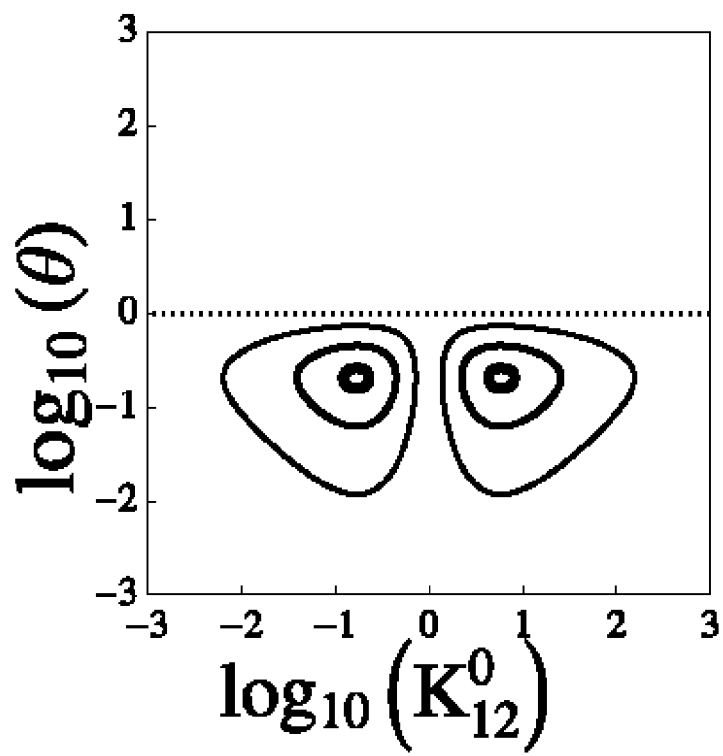
Figure 2H:
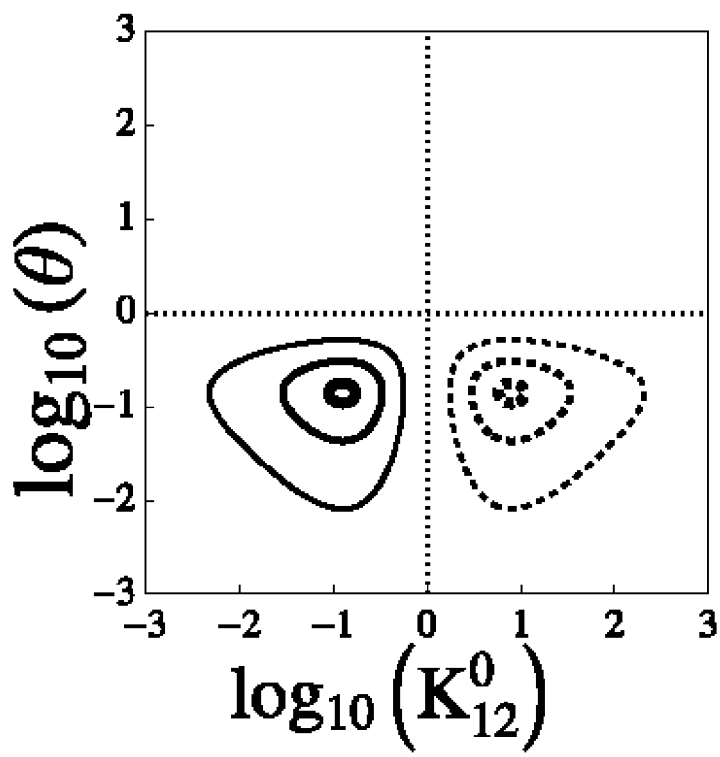
Figure 2I:
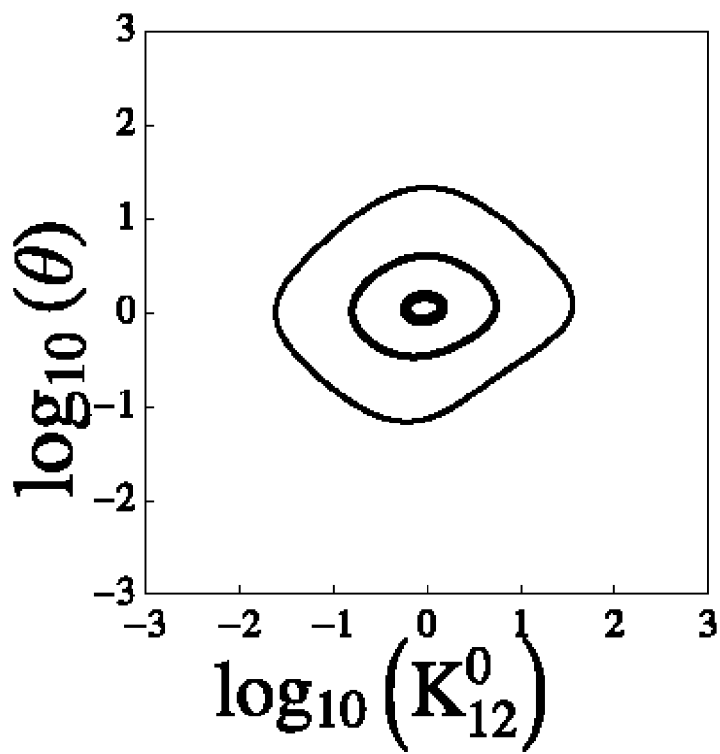
Figure 2J:
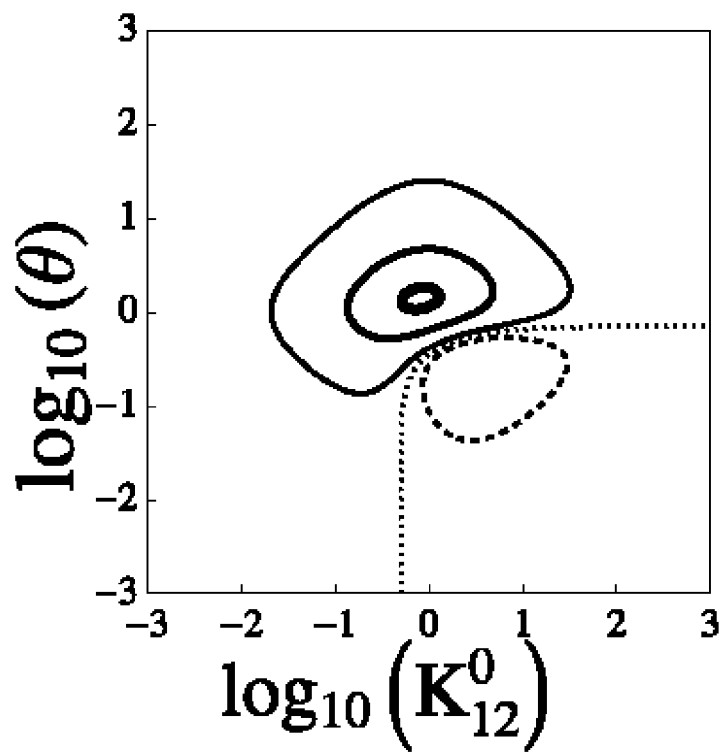
Figure 2K:
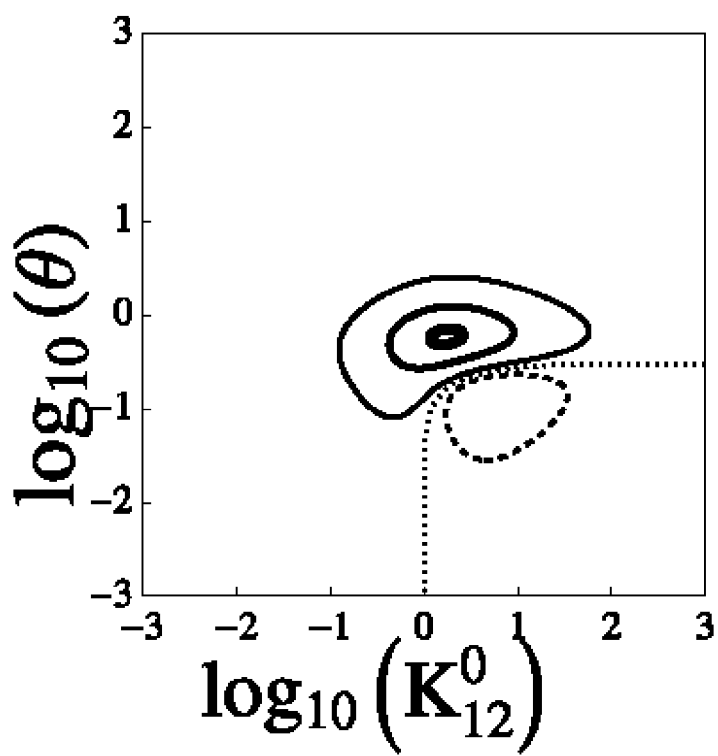
Figure 2L:
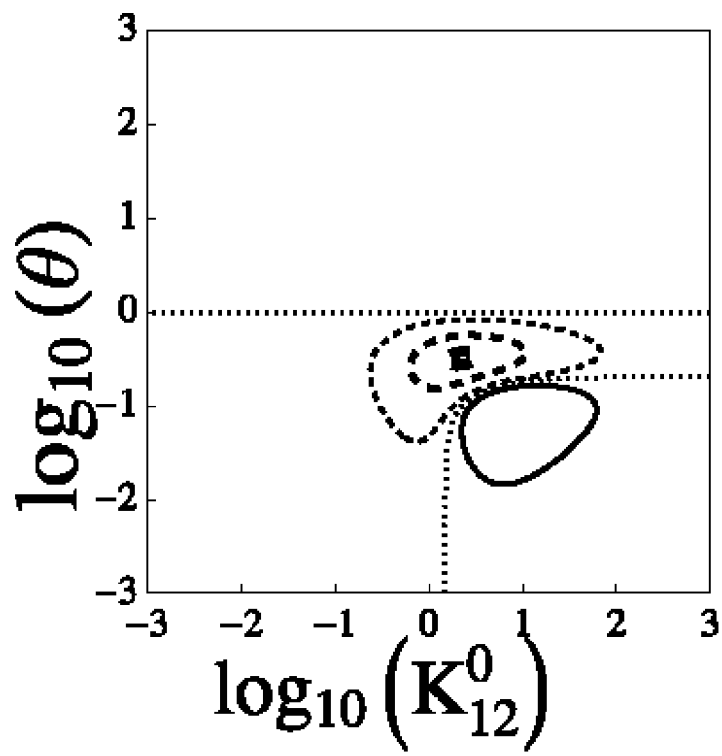

The equations above allow computing maps of the different harmonic components of the fluorescence intensity and of the concentration of state 2 as a function of the control parameters: $I_1$, $I_2$, $\omega$, or suitable functions thereof. FIGS. 2A-2L show such maps in the $(K_{12}^0, \theta)$ space. It is recalled that $K_{12}^0$ is a dimensionless parameter proportional to $I_1^0$ if $I_2^0 = 0$ or $I_1^0/I_2^0$ otherwise and $\theta$ is a dimensionless parameter proportional to $\omega$. Interestingly, when the harmonic components are expressed as a function of $K_{12}^0$ and $\theta$, they do not explicitly depend on the photochemical properties of the reversibly photoswitchable species (this is possible because $K_{12}^0$ and $\theta$ do depend on them). As a consequence, the maps of FIGS. 2A-2L are "universal": they depend on the illumination conditions (single wavelength, double wavelength with single modulation, double wavelength with double modulation in phase opposition), but not on a specific reversibly photoswitchable species. In all cases, dual-wavelength illumination with either single modulation or dual modulation in phase opposition, the modulation is sinusoidal and with large amplitude ($\alpha=1$). Single-wavelength illumination is treated as a specific case of dual-wavelength illumination with single modulation, wherein the intensity of the constant component is zero. More specifically:

FIG. 2A is a map of $\Im^{1,in}_{norm}$ for single-wavelength modulation;

FIG. 2B is a map of $\Im^{1,in}_{norm}$ $norm^{2,in}$ for single-wavelength modulation;

FIG. 2C is a map of $\Im^{1,in}_{norm}$ for single-wavelength modulation;

FIG. 2D is a map of $\Im^{1,in}_{norm}$ for single-wavelength modulation;

FIG. 2E is a map of $\Im^{1,in}_{norm}$ for dual-wavelength modulation;

FIG. 2F is a map of $\Im^{1,in}_{norm}$ for dual-wavelength modulation;

FIG. 2G is a map of $\Im^{1,in}_{norm}$ for dual-wavelength modulation;

FIG. 2H is a map of $\Im^{1,in}_{norm}$ for dual-wavelength modulation;

FIG. 2I is a map of $\Im^{1,out}_{\mathfrak{F},norm}$ for single-wavelength modulation;

FIG. 2J is a map of $\Im^{2,in}_{\mathfrak{F},norm}$ for single-wavelength modulation;

FIG. 2K is a map of $\Im^{3,out}_{\mathfrak{F},norm}$ for single-wavelength modulation;

FIG. 2L is a map of $\Im^{4,in}_{\mathfrak{F},norm}$ for single wavelength modulation.

In the case of single wavelength modulation involving two wavelengths, the fluorescence maps displayed in FIGS. 2I-2L correspond to the case where the modulated wavelength switches the species from a bright to a dark state associated with a significant brightness at the modulated wavelength. When the modulated wavelength switches the species from a dark to a bright state, the fluorescence maps differ only by the sign from the maps displayed in FIGS. 2I-2L. For a bright state with two different brightnesses at the two wavelengths, qualitatively different fluorescence maps are obtained for light modulation at the wavelength associated with the smallest brightness. In this case, the fluorescence maps are close to the concentration maps.

It can be seen that the first order amplitude $2^{1,out}_{norm}$ is well-approximated by the out-of-phase response obtained with both light modulations of small amplitude.([Quérard 2015]; [Quérard 2017]) In both single and dual wavelength light modulation, it exhibits a similar symmetrical peak with respect to $K_{12}^0$ and $\theta$ with a broader bandwidth along $K_{12}^0$ than along $\theta$. Its resonance at $K_{12}^0 = 1$ and $\theta = 1$ optimizes both the composition shift occurring with light modulation (maximized when the forward and backward reactions driven by illumination occur at the same rate so that $K_{12}^0 = 1$) and the phase lag of the response to light modulation ($\pi/2$ when the radial frequency of the light modulation $\omega$ is matched with the exchange relaxation time $\tau_{12}^0$ so that $\theta = 1$).

Interestingly $2^{1,out}_{norm}$ at resonance is twice higher with dual wavelength than with single wavelength light modulation. In contrast to $2^{1,out}_{norm}$, single and dual wavelength modulation generate different maps of the higher terms of the concentration modulation. With single wavelength modulation, the position of the resonance shifts towards higher and lower values for $K_{11}^0$ and $\theta$ respectively from $2^{1,out}_{norm}$ to $2^{4,in}_{norm}$. Along the $K_{12}^0$-axis, approximate analytical expressions yield resonance for $K_{12}^{0,R} = n$ where n designates the harmonics order. In contrast, a simple analytical expression of the resonance along the $\theta$-axis could not be derived. Numerical computation showed that the resonant $\theta^R$ value dropped from 1 as n increases. With dual wavelength modulation, not anymore one but two resonances are observed at higher orders n in the $(K_{12}^0, \theta)$ space with either a symmetry or anti-symmetry relationship with respect to the $K_{12}^0 = 1$ axis. The position of these resonances shifts symmetrically towards higher and lower values for $K_{12}^0$ (with $|K_{12}^{0,R}| = n \pm \sqrt{n^2 - 1}$), and towards lower values for $\theta$ from $2^{1,out}_{norm}$ to $2^{4,in}_{norm}$. For both modulated illuminations, the resonance peak becomes more and more asymmetric and its bandwidth is reduced along the $K_{11}^0$ and $\theta$ axes when going from $2^{2,in}_{norm}$ to $2^{4,in}_{norm}$.

As per fluorescence, $\mathfrak{I}_{\mathfrak{F},norm}^{1,out}$ essentially exhibits the resonance of $2_{norm}^{1,out}$ but with a lower amplitude and with a slight change of shape. In contrast to $\mathfrak{I}_{\mathfrak{F},norm}^{1,out}$, $\mathfrak{I}_{\mathfrak{F},norm}^{2,in}$, $\mathfrak{I}_{\mathfrak{F},norm}^{3,out}$, and $\mathfrak{I}_{\mathfrak{F},norm}^{4,in}$ exhibit either one (if $\lambda_2$=405 nm is modulated) or two (if $\lambda_1$=480 nm is modulated) resonances in the ($K_{12}^0,\theta$) space. Interestingly if $\lambda_1$=480 nm is modulated, $\mathfrak{I}_{\mathfrak{F},norm}^{2,in}$ and $\mathfrak{I}_{\mathfrak{F},norm}^{3,out}$ possess one line of vanishing amplitude, and $\mathfrak{I}_{\mathfrak{F},norm}^{4,in}$ possesses two lines of vanishing amplitude. The highest peak experiences a more pronounced drop of the bandwidth upon increasing n than the resonance observed for the corresponding concentration terms. In particular, the drop is more pronounced along the $\theta_{axis}$ than the $K_{12}^0$ axis.

The dimensionless ($K_{12}^0,\theta$) space is appropriate for theoretical computations and analysis since all reversibly photoswitchable species exhibit the same behavior in this space. However the illumination control parameters ($\omega,I_1^0,I_2^0$) are more relevant for applications in analysis or imaging. Indeed, in such a space, the positions of the resonance peaks are species-dependent, and therefore allow discriminating different reversibly photoswitchable species. In the case of single-wavelength illumination, a suitable parameter space will be ($\omega,I_1^0$), while in the case of double-wavelength illumination ($\omega/I_1^0,I_2^0/I_1^0$) will be preferably used.

This will be illustrated with the help of FIGS. 3A-3F, 4A-4F, 5A-5F and 6A-6F.

FIGS. 3A-3F show the maps of the oscillating concentration and fluorescence intensity components at different orders n=1, 2, 3, and 4 for the reversibly photoswitchable fluorescent protein Dronpa-2 submitted to dual-wavelength illumination in the ($\omega/I_1^0,I_2^0/I_1^0$) space (a single-wavelength illumination which can be considered as a particular case of dual-wavelength illumination with $I_2^0$=0 in the ($K_{12}^0,\theta$) space, is not accounted for by these maps). Dronpa-2 is switched to a dark state by blue light (480 nm) and returns to the initial bright state by violet light (405 nm), a behavior known as negative photochromism.

Figure 3A:
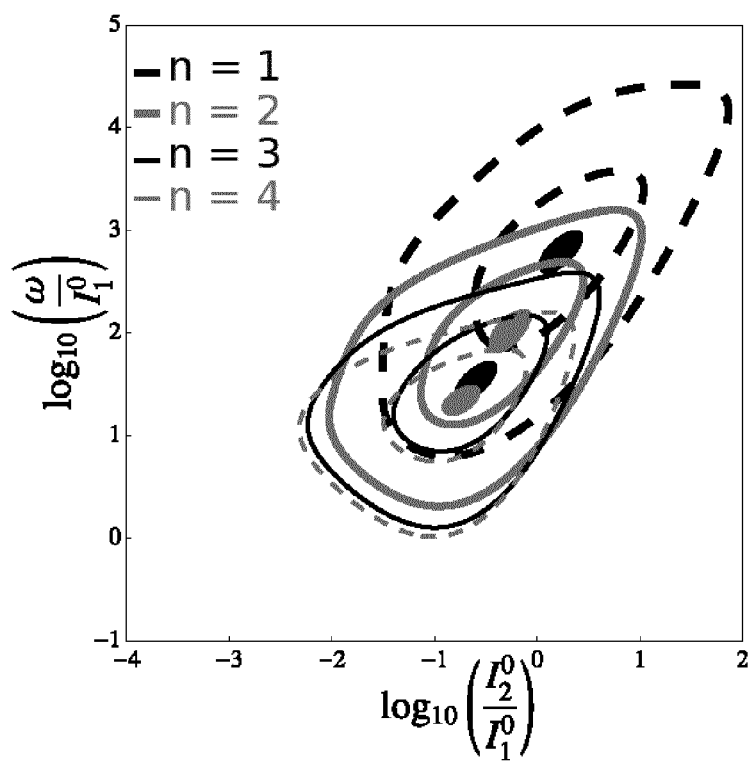
FIGS. 3A-3F show the theoretical dependence of concentrations (3A-3C) and fluorescence intensity (3D-3F) of Dronpa-2 on control parameters (ratio of light intensities and modulation frequency)
Figure 3B:
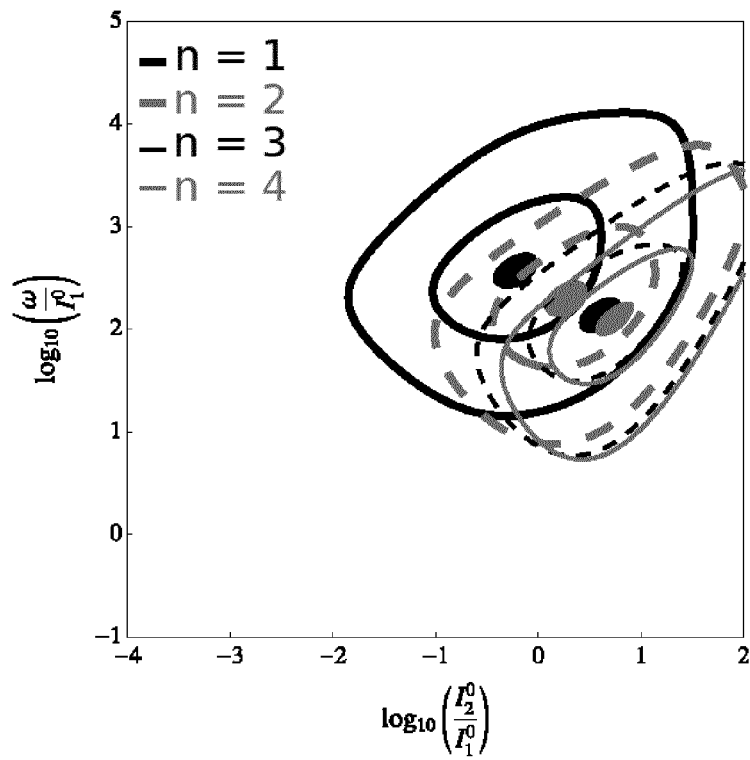
Figure 3C:
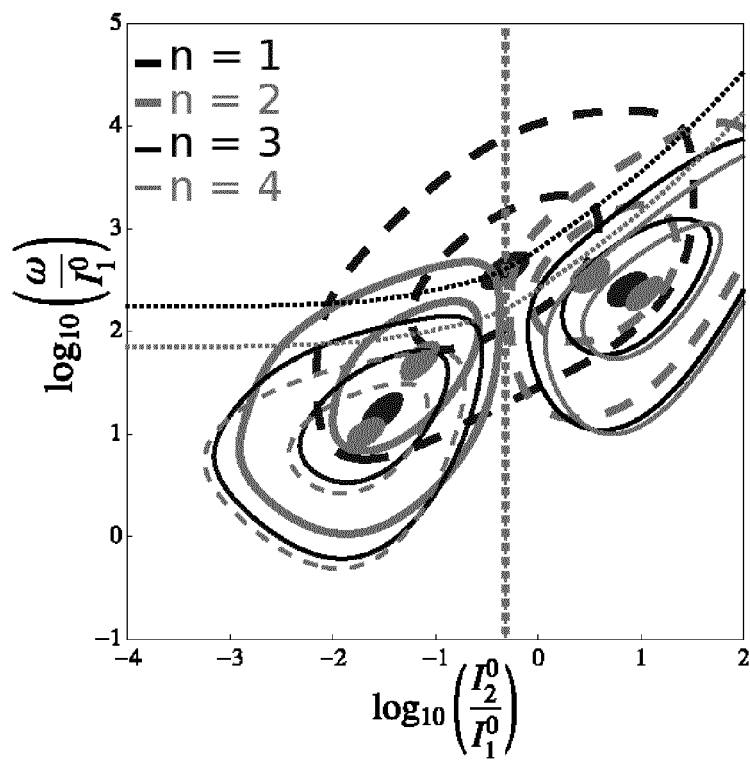
Figure 3D:
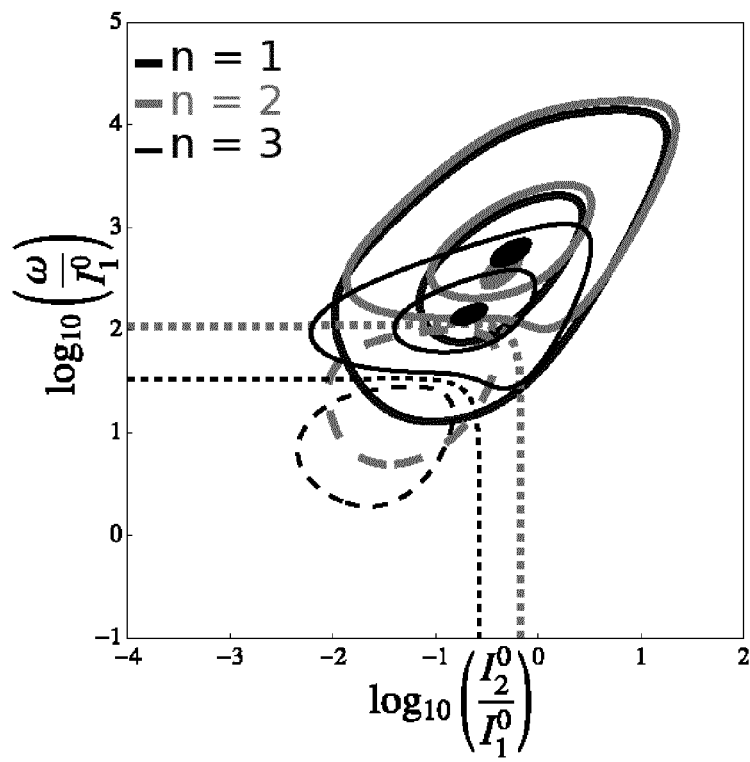
Figure 3E:
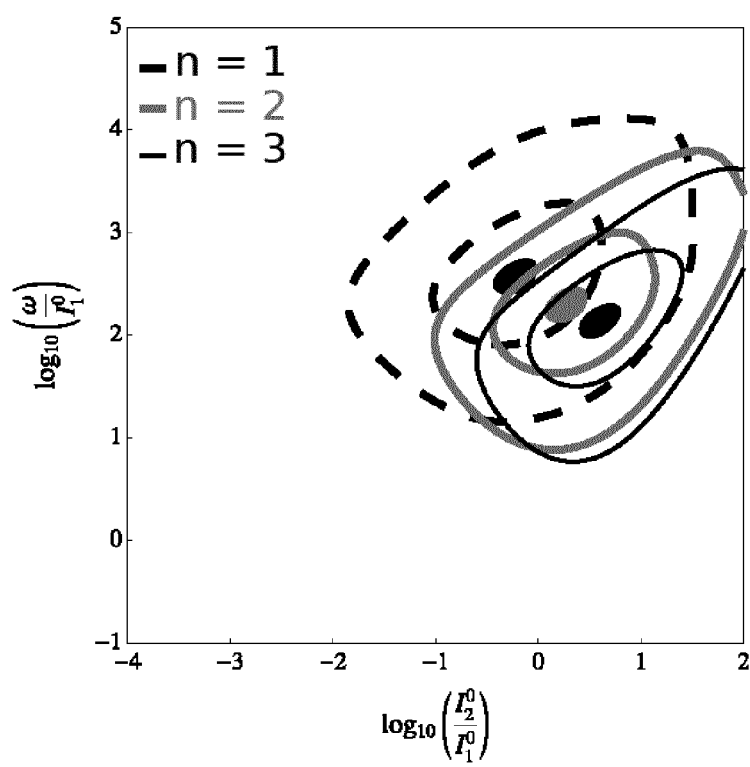
Figure 3F:
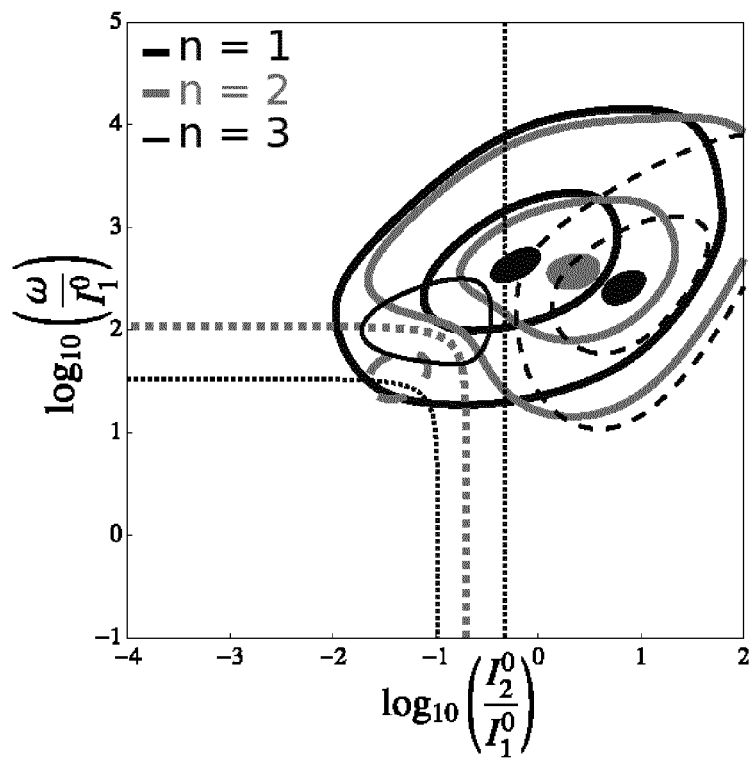

More precisely:

FIG. 3A is a map of the oscillating concentration components $2_{norm}^{n,in/out}$ ("out" for n=1, 3; "in" for n=2, 4) for single-wavelength modulation with $\lambda_1$=480 nm (modulated) and $\lambda_2$=405 nm (constant intensity);

FIG. 3B is a map of the oscillating concentration components $2_{norm}^{n,in/out}$ ("out" for n=1, 3; "in" for n=2, 4) for single-wavelength modulation with $\lambda_2$=405 nm (modulated) and $\lambda_1$=480 nm (constant intensity);

FIG. 3C is a map of the oscillating concentration components $2_{norm}^{n,in/out}$ ("out" for n=1, 3; "in" for n=2, 4) for dual-wavelength modulation with $\lambda_1$=480 nm and $\lambda_2$=405 nm;

FIG. 3D is a map of the oscillating fluorescence intensity components $\mathfrak{I}_{\mathfrak{F},norm}^{n,in/out}$ ("out" for n=1, 3; "in" for n=2) for single-wavelength modulation with $\lambda_1$=480 nm (modulated) and $\lambda_2$=405 nm (constant intensity);

FIG. 3E is a map of the oscillating fluorescence intensity components $\mathfrak{I}_{\mathfrak{F},norm}^{n,in/out}$ ("out" for n=1, 3; "in" for n=2) for single-wavelength modulation with $\lambda_2$=405 nm (modulated) and $\lambda_1$=480 nm (constant intensity);

FIG. 3F is a map of the oscillating fluorescence intensity components $\mathfrak{I}_{\mathfrak{F},norm}^{n,in/out}$ ("out" for n=1, 3; "in" for n=2) for dual-wavelength modulation with $\lambda_1$=480 nm and $\lambda_2$=405 nm.

Intensity is set at $I_1^0$=1 Ein·s$^{-1}$·m$^{-2}$ (250 W/cm$^2$) and the photochemical properties of Dronpa-2 are expressed by the following parameters: $\sigma_{12,1}$=196 m$^2$·mol$^{-1}$, $\sigma_{21,2}$=413 m$^2$·mol$^{-1}$ (for $\lambda_1$=480 nm and $\lambda_2$=405 nm).

We denote by $K_{12,n}^{0,R}$ and $\theta_n^R$ the coordinates of the resonance evidenced for the concentration amplitude of the n-th order. Beyond evidencing the behavior already discussed above, the figures clearly show a diagonal shift of the resonance peaks. For a single modulation, in both evaluated cases of light modulation ($\lambda_1$=480 nm and $\lambda_2$=405 nm), resonance respectively shifts toward lower values of $I_2^0/I_1^0$ and $\omega/I_1^0$ when the order n of the amplitude is increased due to the corresponding evolution of $K_{12,n}^{0,R}$ and $\theta_n^R$. For dual modulation, resonances display two different shifts, respectively toward higher and lower values of $I_2^0/I_1^0$ and lower values of $\omega/I_1^0$ when the order n of the amplitude is increased due to the corresponding evolution of $K_{12,n}^{0,R}$ and $\theta_n^R$.

The general theory developed above allows determining the following expression for the resonance conditions in two different limiting cases 1. The reversible photoconversion of the fluorophore is driven by the wavelength $\lambda_1$ (backward reaction is thermally driven). Using Eqs. (14), (22), (23), the resonance condition becomes:

$$I_1^0 = K_{12,n}^{0,R} \frac{k_{21}^\Delta}{\sigma_{12,1}} \tag{65}$$

$$\omega = \theta_n^R (\sigma_{12,1} I_1^0 + k_{21}^\Delta) \tag{66}$$

Both control parameters $I_1^0$ and $\omega$ are now fixed at resonance of the amplitude of the n-th order:

$$I_1^0 = K_{12,n}^{0,R} \frac{k_{21}^\Delta}{\sigma_{12,1}} \tag{67}$$

$$\omega = \theta_n^R (1 + K_{12,n}^{0,R}) k_{21}^\Delta \tag{68}$$

In particular, Eqs. (67), (68) enable to derive the shift of the resonance peak between the orders n and m, in logarithmic scale:

$$\log \frac{I_{1,n}^0}{I_{1,m}^0} = \log \frac{K_{12,n}^{0,R}}{K_{12,m}^{0,R}} \tag{69}$$

$$\log \frac{\omega_n}{\omega_m} = \log \frac{\theta_n^R}{\theta_m^R} + \log \frac{1+K_{12,n}^{0,R}}{1+K_{12,m}^{0,R}} \tag{70}$$

2. The reversible photoconversion of the fluorophore is driven by two wavelengths $\lambda_1$ and $\lambda_2$. Using Eqs. (14), (18), (19) the resonance conditions become:

$$\frac{I_2^0}{I_1^0} = \frac{1}{K_{12,n}^{0,R}} \frac{\sigma_{12,1}}{\sigma_{21,2}} \tag{71}$$

-continued $$\omega = \theta_n^R (\sigma_{12,1} I_1^0 + \sigma_{21,2} I_2^0) \quad (72)$$

Once the intensity $I_1^0$ satisfies the condition of neglecting thermal contribution to the backward reaction, both control parameters $I_2^0$ and $\omega$ are fixed to optimize the resonant amplitude of the n-th order:

$$I_2^0 = \frac{1}{K_{12,n}^{0,R}} \frac{\sigma_{12,1}}{\sigma_{21,2}} I_1^0 \quad (73)$$

$$\omega = \theta_n^R \left(1 + \frac{1}{K_{12,n}^{0,R}}\right) \sigma_{12,1} I_1^0. \quad (74)$$

Eqs. (73), (74) enable to derive the shift of the resonance peak between the orders n and m, in logarithmic scale:

$$\log \frac{\frac{I_{2,n}^0}{I_{1,n}^0}}{\frac{I_{2,m}^0}{I_{1,m}^0}} = \log \frac{K_{12,m}^{0,R}}{K_{12,n}^{0,R}} \quad (75)$$

$$\log \frac{\frac{\omega_n}{I_{1,n}^0}}{\frac{\omega_m}{I_{1,m}^0}} = \log \frac{\theta_n^R}{\theta_m^R} + \log \frac{1 + \frac{1}{K_{12,n}^{0,R}}}{1 + \frac{1}{K_{12,m}^{0,R}}} \quad (76)$$

FIGS. 4A-4F, 5A-5F, 6A-6F display the dependence of the amplitudes of the oscillating concentration ($2_{norm}^{1,out}$, $2_{norm}^{2,in}$, $2_{norm}^{3,out}$ and $2_{norm}^{4,in}$) and of the fluorescence emission ($\mathfrak{I}_{\mathcal{F},norm}^{1,out}$, $\mathfrak{I}_{\mathcal{F},norm}^{2,in}$ and $\mathfrak{I}_{\mathcal{F},norm}^{3,out}$) for eight investigated reversibly photoswitchable fluorescent proteins (RSFPs) Dronpa, Dronpa-2, Dronpa-3, rsFastLime, rsEGFP2, and Padron in the space of the control parameters. Dronpa, Dronpa-3, rsFastLime, rsEGFP2 exhibit negative photochromism, like Dronpa-2, while Padron exhibits positive photochromism (blue light switches it to a bright state and violet light switches it back to a dark state). All these species absorb light at 405 nm and 480 nm and emit spectrally similar fluorescence, making them hard to discriminate by prior art methods. In order to avoid overly cluttered figures, maps for different subsets of fluorophores have been displayed on different groups of figures: Dronpa, Dronpa-2, Dronpa-3 and Padron on FIGS. 4A-4F; Dronpa, Dronpa-2, rsFastLime and Padron on FIGS. 5A-5F; Dronpa, Dronpa-2, rsEGFP2 and Padron on FIGS. 6A-6F.

Figure 4A:
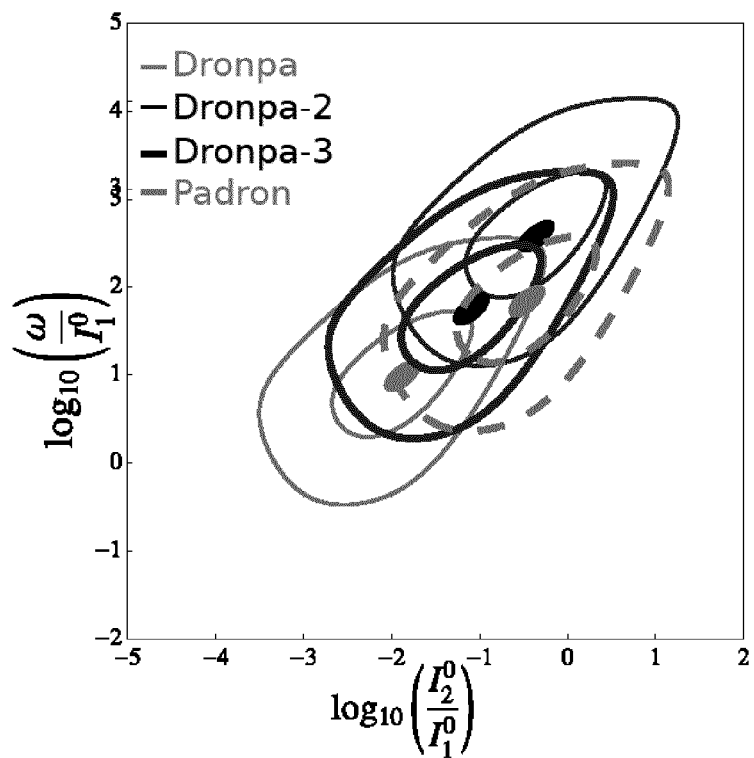
Figure 4B:
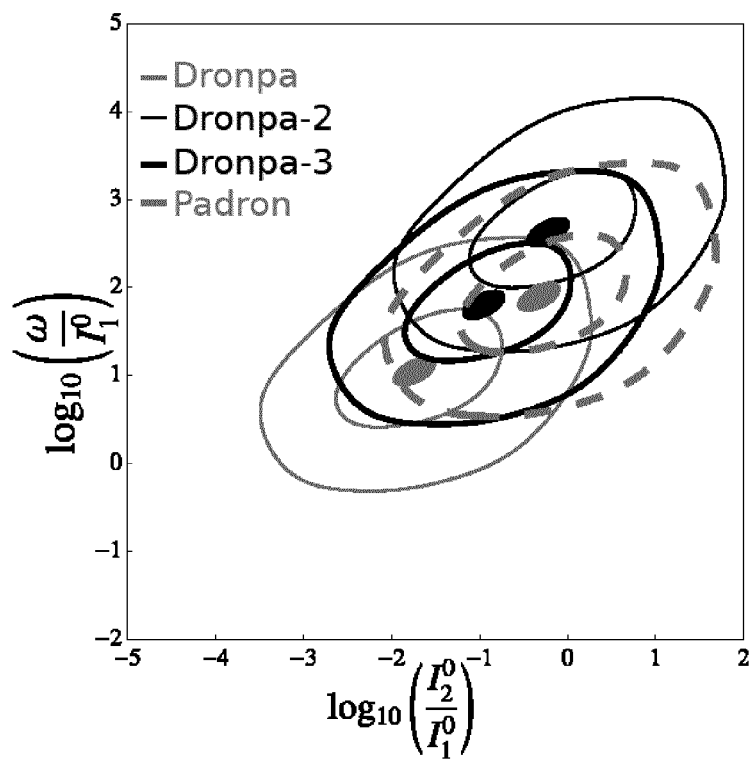
Figure 4C:
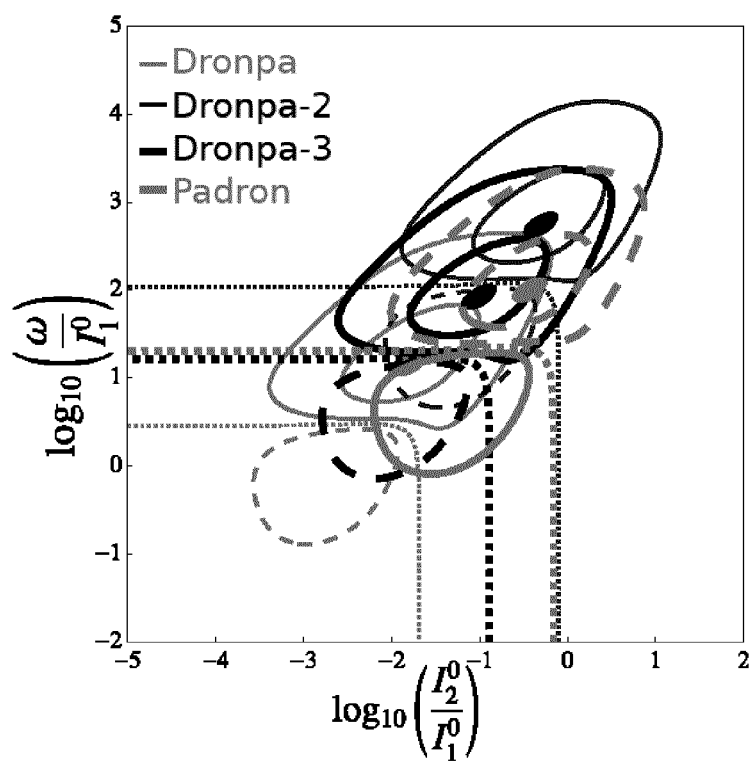
Figure 4D:
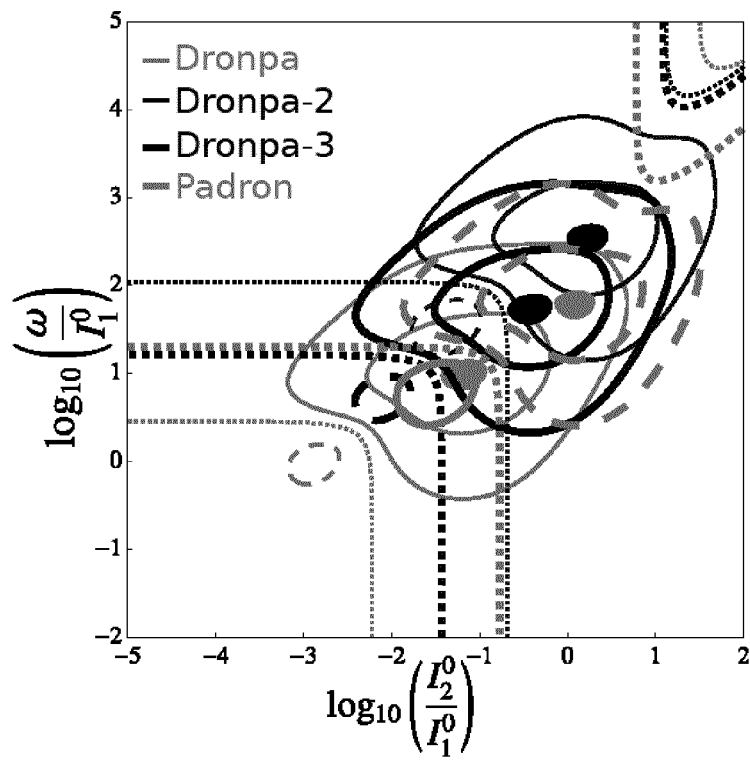
Figure 4E:
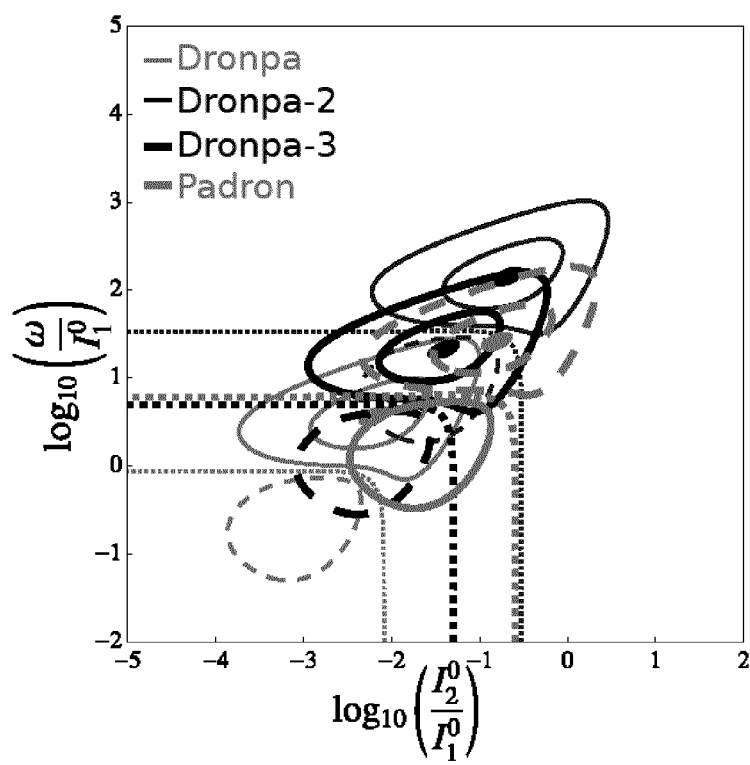
Figure 4F:
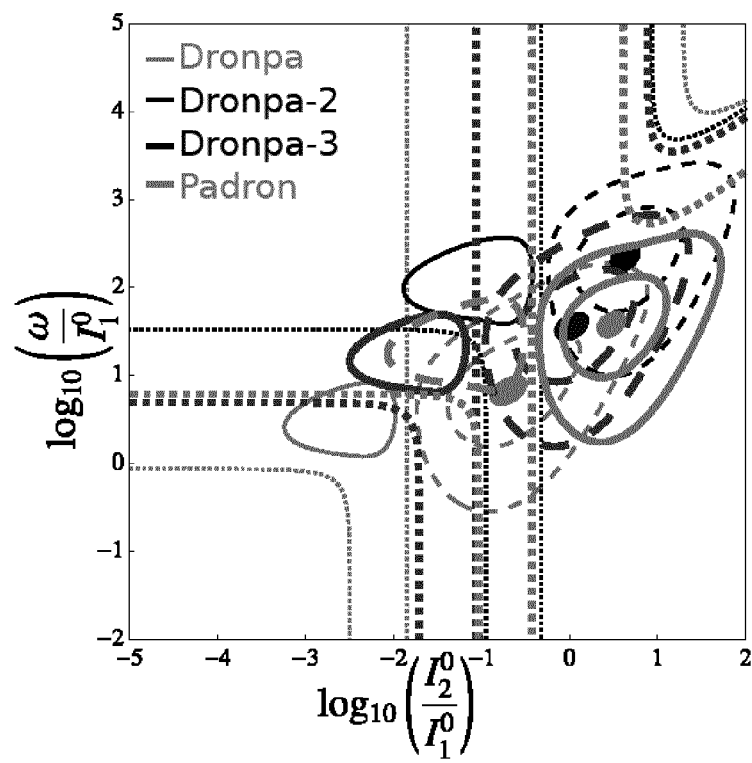
Figure 5A:
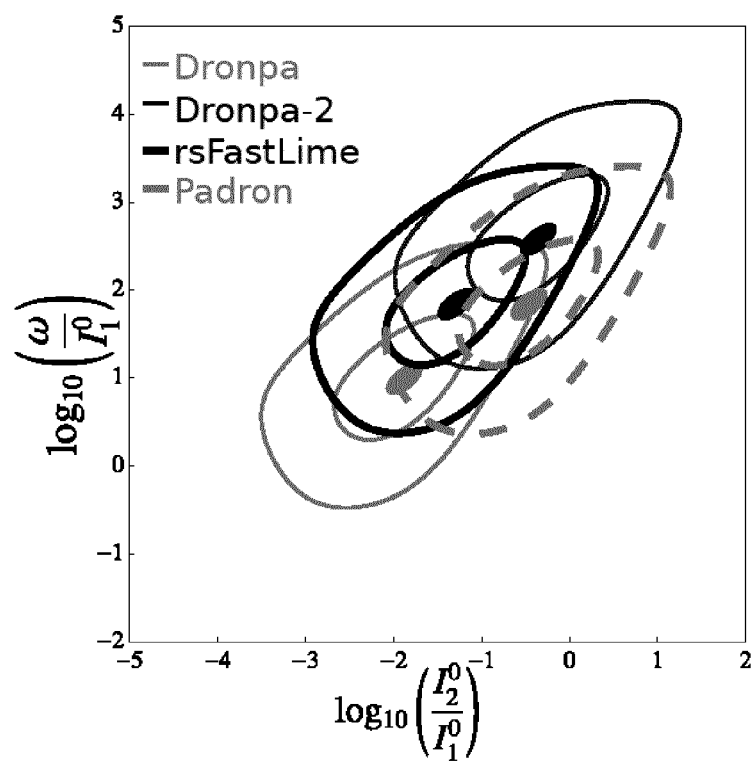
Figure 5B:
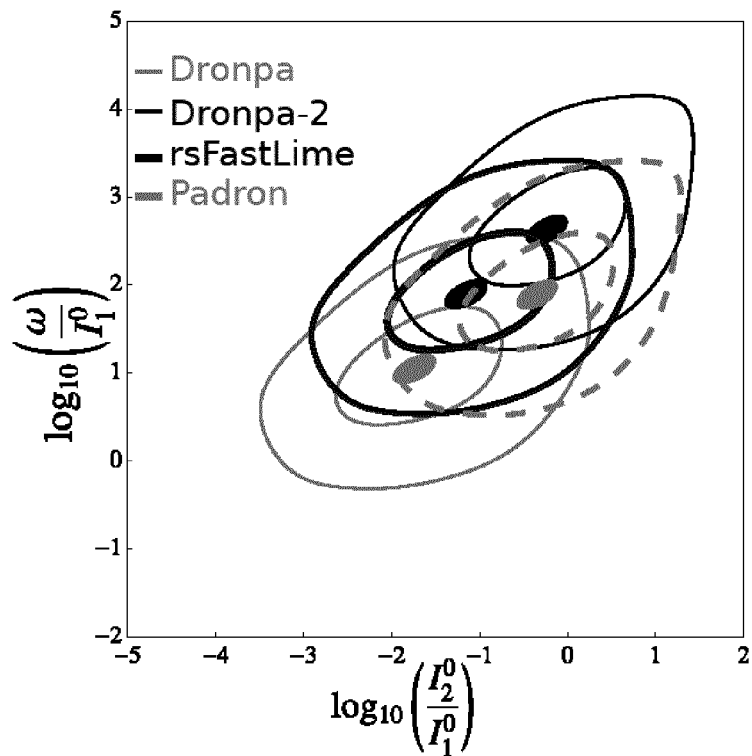
Figure 5C:
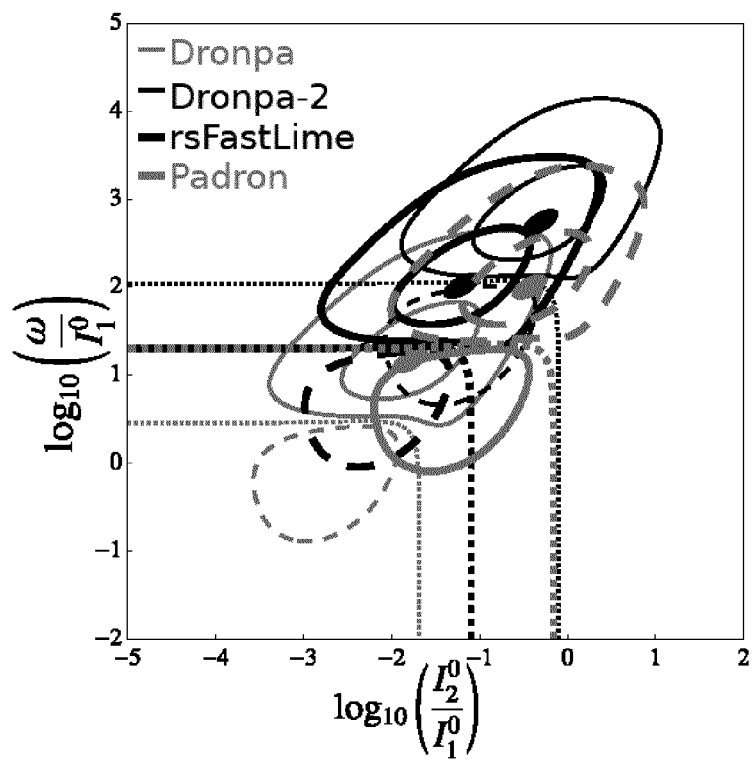
Figure 5D:
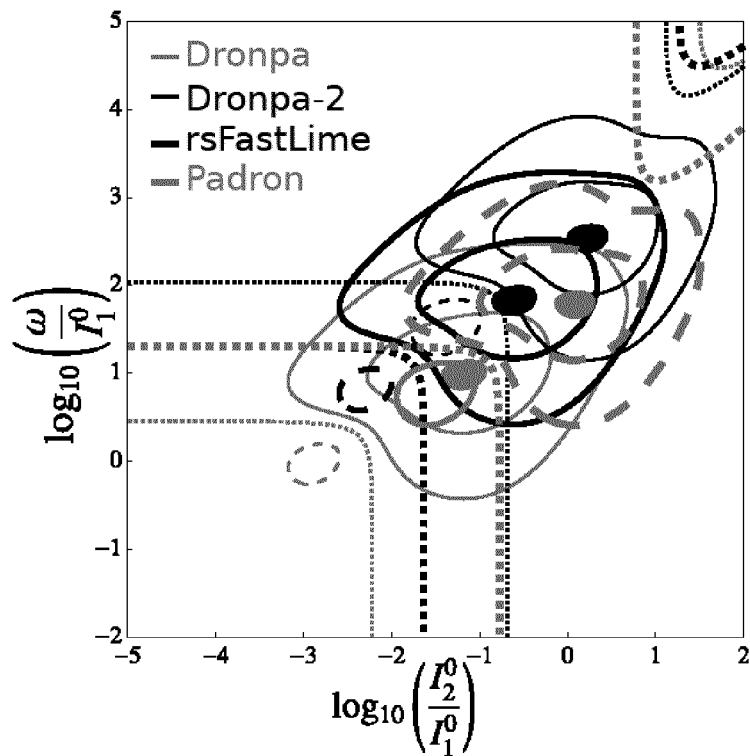
Figure 5E:
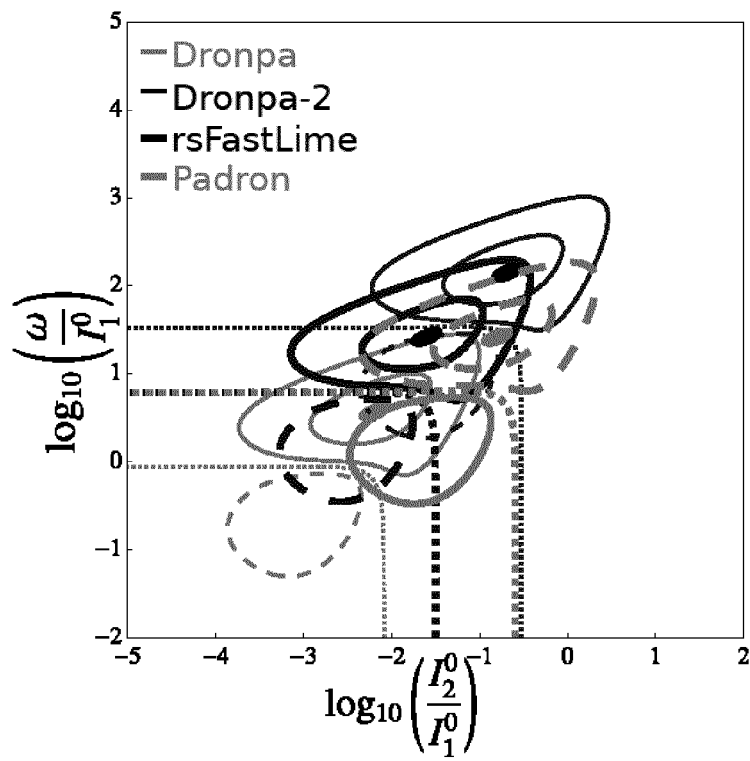
Figure 5F:
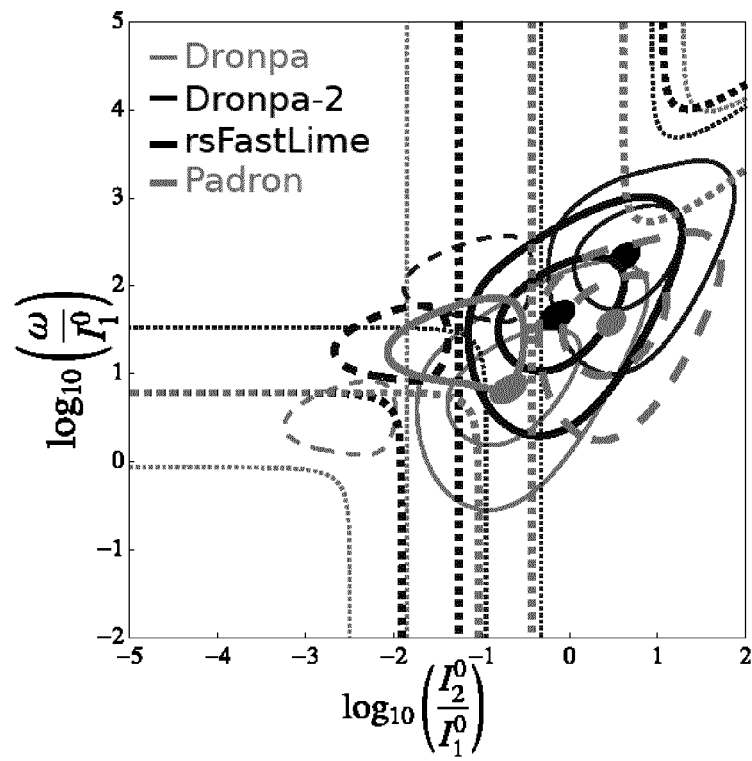
Figure 6A:
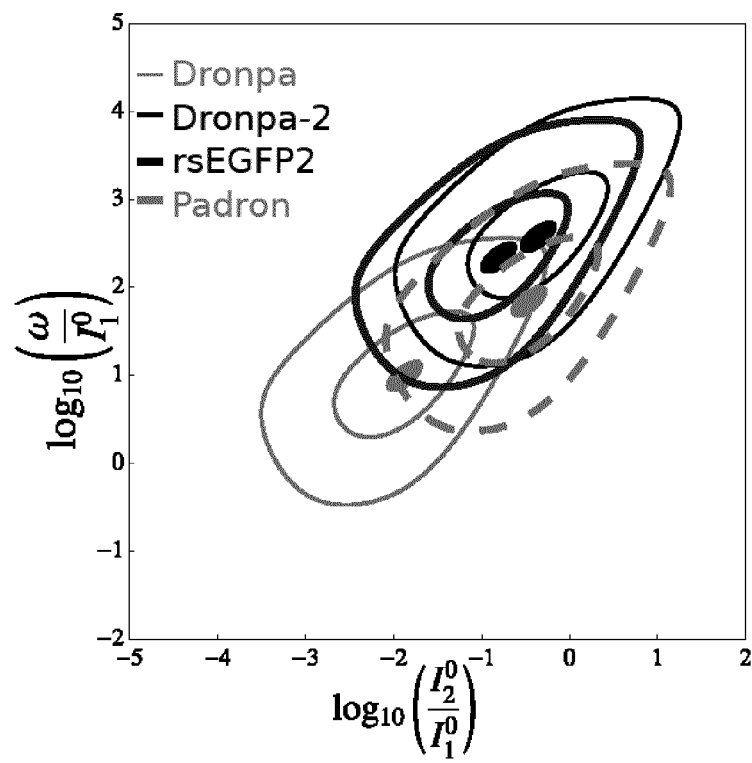
Figure 6B:
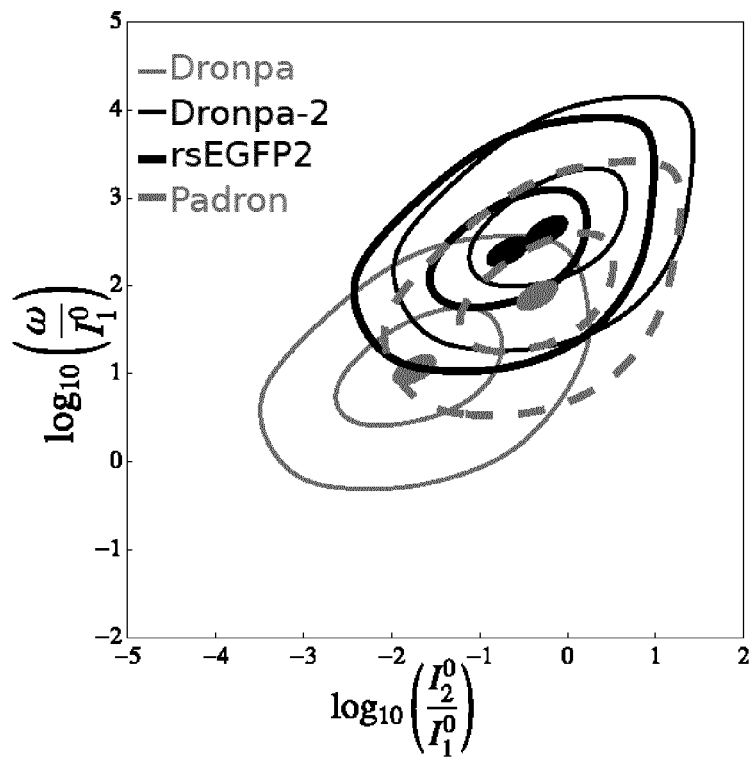
Figure 6C:
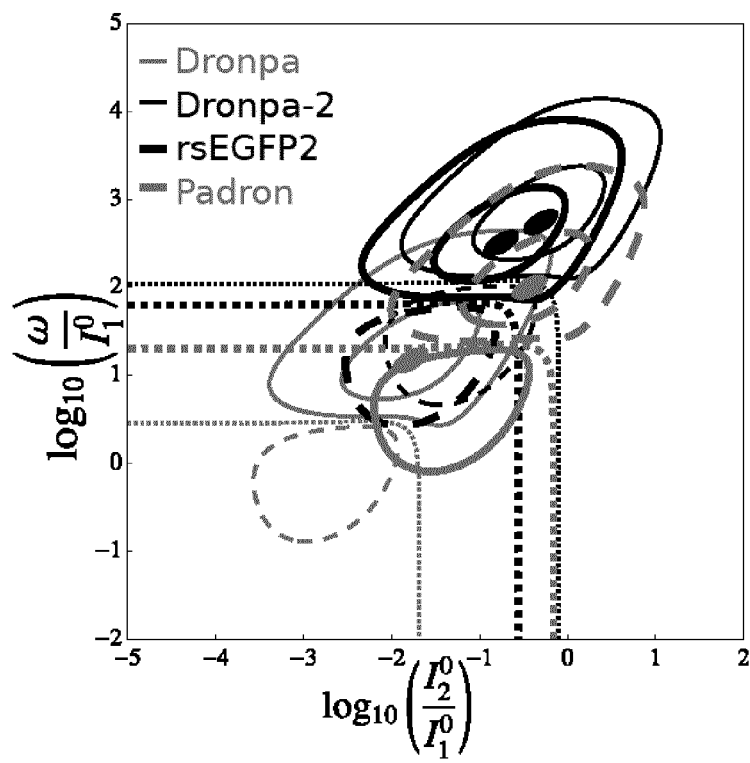
Figure 6D:
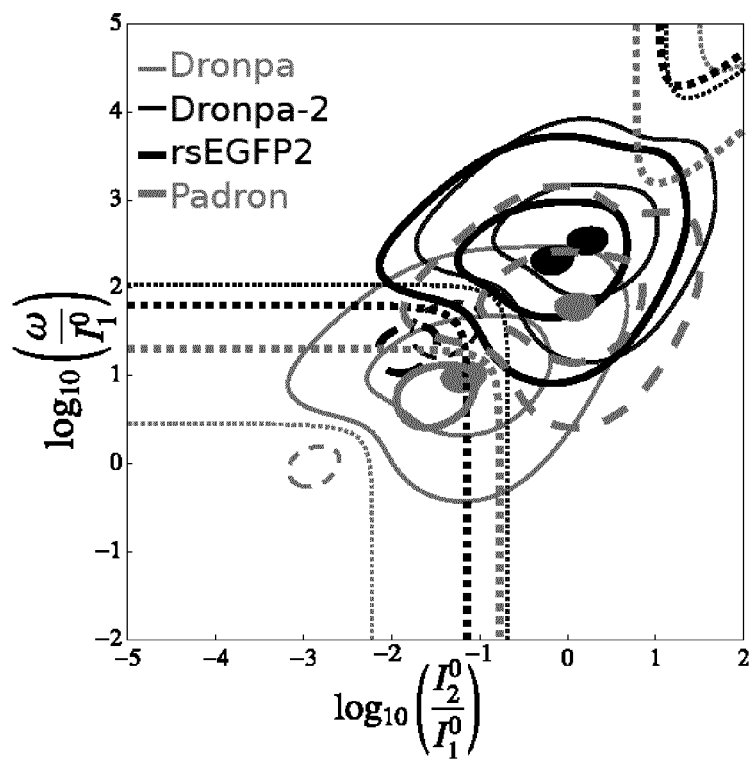
Figure 6E:
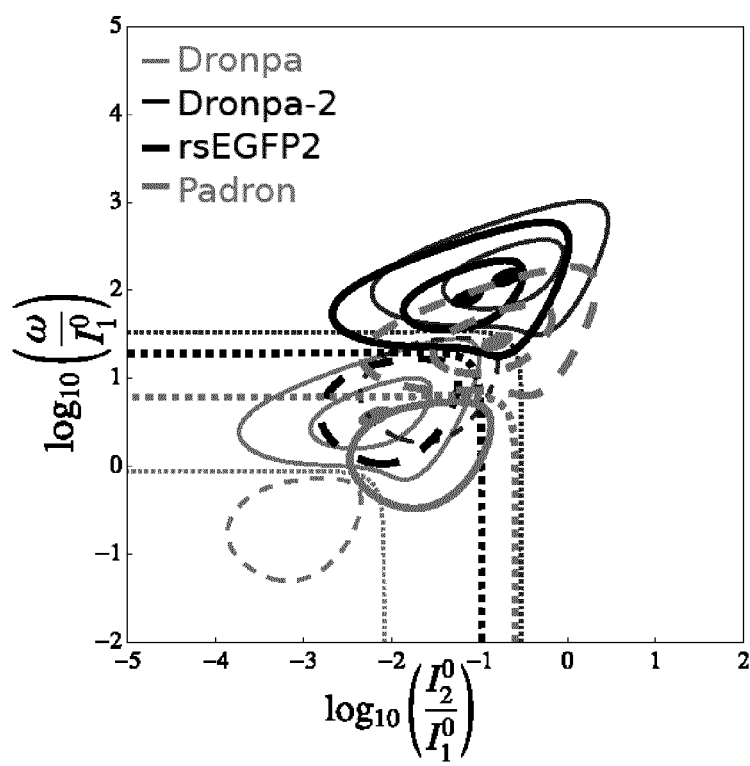
Figure 6F:
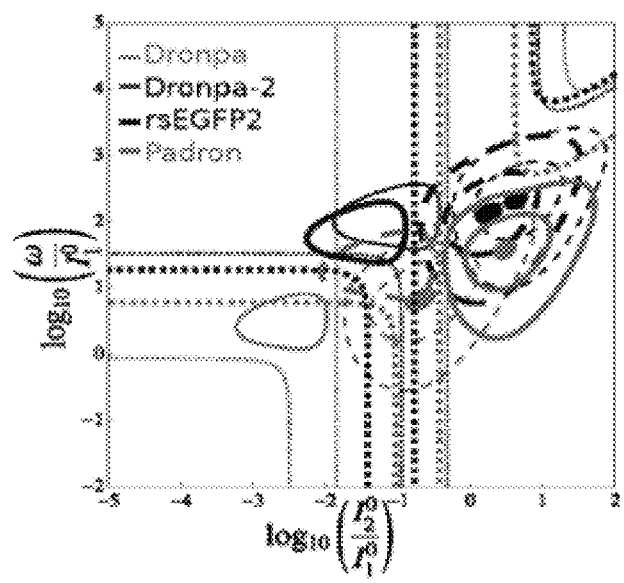

More precisely:

FIGS. 4A, 5A and 6A are maps of the fundamental oscillating fluorescence intensity components $\mathfrak{I}_{\mathcal{F},norm}^{1,out}$ for single-wavelength modulation with $\lambda_1$=480 nm (modulated) and $\lambda_2$=405 nm (constant intensity);

FIGS. 4B, 5B and 6B are maps of the fundamental oscillating fluorescence intensity components $\mathfrak{I}_{\mathcal{F},norm}^{1,out}$ for dual-wavelength modulation with $\lambda_1$=480 nm and $\lambda_2$=405 nm;

FIGS. 4C, 5C and 6C are maps of the second harmonic fluorescence intensity components $\mathfrak{I}_{\mathcal{F},norm}^{2,in}$ for single-wavelength modulation with $\lambda_1$=480 nm (modulated) and $\lambda_2$=405 nm (constant intensity);

FIGS. 4D, 5D and 6D are maps of the second harmonic fluorescence intensity components $\mathfrak{I}_{\mathcal{F},norm}^{2,in}$ for dual-wavelength modulation with $\lambda_1$=480 nm and $\lambda_2$=405 nm;

FIGS. 4E, 5E and 6E are maps of the third harmonic fluorescence intensity components $\mathfrak{I}_{\mathcal{F},norm}^{3,out}$ for single-wavelength modulation with $\lambda_1$=480 nm (modulated) and $\lambda_2$=405 nm (constant intensity); and FIGS. 4F, 5F and 6F are maps of the third harmonic fluorescence intensity components $\mathfrak{I}_{\mathcal{F},norm}^{3,out}$ for dual-wavelength modulation with $\lambda_1$=480 nm and $\lambda_2$=405 nm.

As expected from the resonance conditions (73), (74) the positions of the RSFPs resonances are scattered in the space of the control parameters since RSFPs exhibit distinct photochemical parameters (e.g. cross-sections for photoswitching). It is worthy of note that the resonance coordinates associated with a modulation at $\lambda_1$=480 nm with or without a modulation at $\lambda_2$=405 nm are different from the coordinates associated with a single modulation at $\lambda_2$=405 nm. Scattering is more pronounced for a single modulation at $\lambda_1$=480 nm;

In contrast, as anticipated from $K_{12,n}^{0,R}$ and $\theta_n^{0,R}$ values (see Eqs. (74), (76)) the shift of the resonance position at different orders n in the space of the control parameters does not depend on the RSFPs nor on the modulated wavelength. Hence the relative position of the RSFP resonances does not evolve with the order n. Note that the n-dependence of the resonance amplitude is the same in the $(I_2^0/I_1^0, \omega/I_1^0)$ and $(K_{12}^0, \theta)$ spaces;

For all modulation cases, the resonance bandwidth of the concentration amplitude slowly decreases from the first to the fourth order. The effect is more visible for a single modulation at $\lambda_1$=480 nm or dual modulation and from the third order on;

The behavior of the fluorescence intensity amplitude for a single modulation at $\lambda_2$=405 nm is similar to the concentration amplitude. In contrast, the decrease of the bandwidth is more visible when the order increases with a single modulation at $\lambda_1$=480 nm. The second order brings already a better RSFP discrimination than the first order, and the map is clarified from the third order on (for instance Dronpa stands out). For the dual modulation, the second order display broader bandwidth than the first order, but the third order brings a better RSFP discrimination than the first order. However at all orders the single modulation at $\lambda_1$=480 nm brings more RSFP discrimination than the dual modulation;

The figures clearly show that for the single modulation at $\lambda_1$=480 nm the decreased resonance overlapping of the third order amplitude of the fluorescence can be used to discriminate four RSFPs: Dronpa, Dronpa-2, Dronpa-3 or rsFastLime, and Padron which exhibits a fluorescence amplitude of opposite sign with respect to the three others.

The utilization of high order responses of the fluorescence emission to the light modulation is favorable to discriminate distinct RSFPs. However, since the amplitude of the n-order response drops with n, a compromise has to be found between the bandwidth (higher orders enable us a better discrimination) and the amplitude (lower orders exhibit a higher amplitude).

Unlike the fundamental components used in OPIOM and Speed OPIOM, harmonic components exhibit, in addition to resonant peaks, zero-amplitude lines which allow selectively "turning off" the contribution of a RSFP at a particular order. Therefore, in order to discriminate between two species, a user has the choice of maximizing the contribution(s) from one species, extinguishing the contribution(s) from another one or finding a suitable compromise to maximize the dynamic contrast. Several oscillating (fundamental and harmonic) contributions may be simultaneously used for detection. Several reversibly photoswitchable species may be discriminated by performing several measurements with different illumination conditions e.g. resonant for the different species to be detected.

Whatever the observable used, signal is proportional to the concentration of the detected species. This can be a drawback, as the out-of-resonance signal of an abundant species may interfere with the resonant signal of the less abundant species to be detected. However, as explained above, the existence of zero-amplitude lines allows "turning off" the interfering signal by a suitable choice of the illumination parameters. Moreover, this makes it possible to estimate absolute or relative concentration of reversibly photoswitchable species from several measurements performed in different illumination conditions. For instance, this can be performed by machine learning (e.g. neural networks, regression analysis . . . ), using samples of known composition for training, or unmixing algorithms.

FIGS. 7A-7I demonstrate the discriminative power of the inventive method applied to epifluorescence microscopy.

Figures 7A, 7B, 7C:
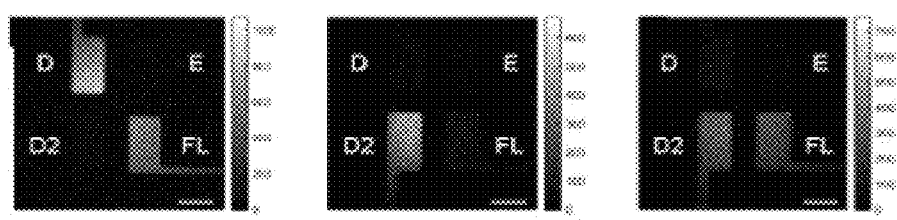

Four chambers of a microfluidic device were respectively filled with solutions of Dronpa, rsFastLime, Dronpa-2, and EGFP; on the figures, the chambers are labeled D, FL, D2 and E, respectively. Dronpa, rsFastLime and Dronpa-2 are spectrally similar RSFPs, which the inventors failed to discriminate using Speed OPIOM, while EGFP is a spectrally similar non-photochemically active fluorophores. The microfluidic device was illuminated using sinusoidally modulating light at $\lambda_1=480$ nm and constant light at $\lambda_2=405$ nm at the resonance conditions for the three RSFPs. More precisely:

FIGS. 7A, 7B and 7C show the images obtained by extracting the quadrature fundamental component of the fluorescence intensity, $\mathfrak{I}^{1out}_{\mathfrak{F},norm}$, at the resonance conditions for Dronpa (FIG. 7A), Dronpa-2 (FIG. 7B) and rsFastLime (FIG. 7C). Whereas the image recorded at Dronpa-2 resonance could almost eliminate the interfering contributions of the two other RSFPs, the images recorded at resonances of Dronpa and rsFastLime encountered strong interferences from rsFastLime and Dronpa-2 respectively. In fact, such a result was anticipated from FIG. 5A, which evidences that $\mathfrak{I}^{1out}_{\mathfrak{F},norm}$, significantly overlaps for the three RSFPs. Hence, use of the first-order component alone (i.e. Speed OPIOM) is not appropriate to discriminate the three RSFPs.

Figures 7D, 7E, 7F:
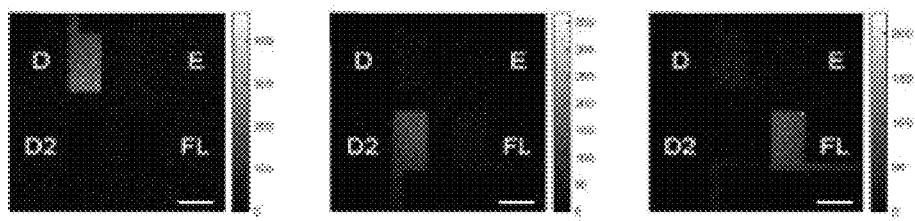

FIGS. 7D, 7E and 7F show the images obtained by extracting the second-order in-phase component $\mathfrak{I}^{2,in}_{\mathfrak{F},norm}$ of the fluorescence intensity, at the resonance conditions for Dronpa (FIG. 7D), Dronpa-2 (FIG. 7E) and rsFastLime (FIG. 7F). It can be seen that the EGFP signal was again efficiently removed from all the images and, most importantly, that the three RSFPs can be selectively targeted at their respective resonance. Beyond the drop of the resonance bandwidth, it can be estimated that this achievement probably originates from the 0 lines observed in the discrimination map of the second harmonic component (see FIG. 7C). Indeed the 0 lines of rsFastLime and Dronpa-2 respectively go through resonance of Dronpa and rsFastLime. Hence the second harmonic component images at resonances of Dronpa and rsFastLime eliminate the interferences with rsFastLime and Dronpa-2 respectively observed using the first-order contribution.

Figures 7G, 7H, 7I:
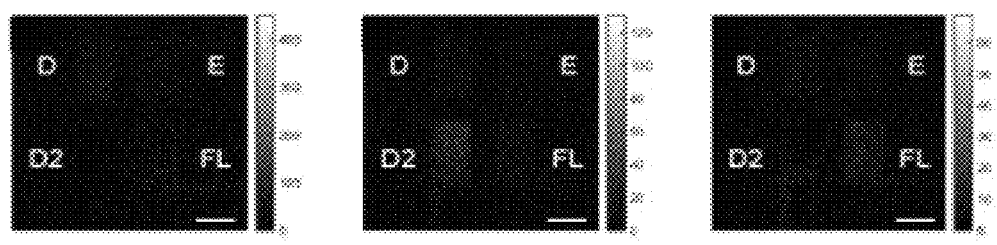

FIGS. 7G, 7H and 7I show the images obtained by extracting the third-order quadrature component $\mathfrak{I}^{1out}_{\mathfrak{F},norm}$ of the fluorescence intensity, at the resonance conditions for Dronpa (FIG. 7G), Dronpa-2 (FIG. 7H) and rsFastLime (FIG. 7I). The theoretical maps suggest a behavior much similar to the one obtained with the second-order component, but the signal-to-noise ratio proved too low to reach any definitive conclusion.

Since a reversibly photoswitchable species possesses singular kinetic properties of photoswitching (and correspondingly its own resonant conditions), when the spatial profile of modulated illumination $(I_1,I_2)$ is not homogeneous, the resonance conditions for a specific harmonic (or fundamental) contribution can only be met at restricted locations, which filters out the fluorescence contributions from out-of-resonance regions. Hence the inventive method is endowed with intrinsic optical sectioning properties. The plot of FIG. 8 shows the evolution of the spatially-integrated signal intensity with the thickness of the sample (triangles correspond to averaged intensity, squares to the first-order quadrature component and disks to the second order in-phase contribution). It can be seen that, beyond 15 µm, the first- and second-order components reach a plateau, demonstrating that their responses originate from a spatially restricted section of the sample. The average fluorescence intensity, instead, continues increasing (albeit sub-linearly) with sample thickness.

It will be easily understood that the sectioning power of the inventive method may be very useful for imaging applications, e.g. in biology.

FIG. 9 shows the block diagram and optical layout of an apparatus for carrying out the invention according to an embodiment of the invention. This apparatus is based on an epi-fluorescence microscope.

The apparatus integrates two colored LEDs: LS1 centered at 480 nm and LS2, centered at 405 nm, as excitation sources, in order to generate a large focal field around the focal plane. Optical filters OF1, OF2 are used to reduce the spectral width of the generated light. Each LED is triggered by a LED driver (DC 4104, Thorlabs, NJ, US), not represented. In turn the led drivers are controlled by a waveform generator WFG, introducing the desired intensity modulation(s).

Light from each source is first collimated by lens L1 (AC254-200-A, f=200 mm, Thorlabs, NJ, US) and then reduced by a quasi-afocal system consisting of two lenses (L2: LA1134-A, f=60 mm, L3: LC2679-A, f=−30 mm, Thorlabs, Newton, NJ). The reduced beams are combined by a dichroic mirror (T425LPXR, Chroma, Bellows Falls, VT) and then focused by a convergent lens L4 (LA1131-A, f=50 mm, Thorlabs, NJ, US). The focal plane of L4 is conjugated to the focal plane of the objective (UPLSAP060XW, 60×, NA 1.2, Olympus Corporation, Tokyo, Japan), with the help of the tube lens system L5 and L6 (AC254-200-A, f=200 mm, Thorlabs, NJ, US). The objective along with the tube lenses L5 and L6 gives a total magnitude of 100:3, forming an illuminated area of 15 µm at the sample. The position of the imaging plan after L4 can be effectively changed by slightly moving the element L3 back and forth along the optical axis, which makes it possible to defocus each wavelength independently from the focal plane of the objective.

According to software simulation, a displacement of the element L3 by 1 mm gives rise to a defocus of 4 μm at the focal plane of the objective. The fluorescence signal from the sample is separated from the excitation lights with another dichroic mirror (T505LPXR, Chroma, Bellows Falls, VT) and then recorded by a CCD camera CAM (Luca-R Andor Technology, Belfast, UK) serving as light detector.

A data processing device such as a computer DPD controls the operation of the waveform generation, in order to determine the desired illumination conditions. Moreover, the computer receives and processes the signal generated by the camera, representative of the fluorescent light intensity, and processes them by extracting the oscillating components used for detecting reversibly photoswitchable species in the sample S.

In many applications, the use of a scanning microscope may be preferred to that of a wide-field microscope as that of FIG. 9. However, Illumination is by essence discontinuous (pulsed) in scanning microscopy, while the invention requires a continuous, preferably sinusoidal modulation (or at least a square-wave modulation with a duty-cycle near to 0.5). However, it is possible to define experimental conditions for which illumination can be nevertheless considered sinusoidal. We define the time $t_c$ as the duration of a light pulse on a pixel and $t_d$ the time between two pulses. A rectangular wave of period $t_c+t_d$ varying between 0 and 1 is decomposed into Fourier series according to:

$$R(t) = \frac{t_c}{t_c + t_d} + \sum_{n=1}^{\infty} \frac{2}{n\pi} \sin\left(\frac{n\Omega t_c}{2}\right) \cos(n\Omega t) \quad (77)$$

where $\Omega = 2\pi/(t_c+t_d)$ is the fundamental angular frequency. We choose an illumination at the wavelength $\lambda_i$ with i=1,2, modeled by the product of the rectangular wave R(t) and a sinusoidal envelope of angular frequency ω oscillating around the mean value $I_i^{0'}$, $$I_i(t) = I_i^{0'} R(t)(1+\alpha \sin(\omega t))$$

where α is the amplitude of oscillation. Imposing $\Omega = k\omega$ where k is an integer, we find:

$$I_i(t) = I_i^{0'} \frac{t_c}{t_c + t_d} (1 + \alpha \sin(\omega t)) + I^{0'} \quad (78)$$

$$\sum_{n=1}^{\infty} \frac{1}{n\pi} \sin\left(\frac{nk\omega t_c}{2}\right) \left[2\cos(nk\omega t) + \alpha\sin(nk+1)\omega t\right] + \alpha\sin((nk-1)\omega t)\right]$$

The desired term $I_i^0)(1+\alpha \sin(\omega t))$ with $I_i^0 = I_i^{0'} t_c/(t_c+t_d)$ at the fundamental frequency is not polluted by the first harmonics obtained for n=1 provided that k is sufficiently large. Adapting the inventive method to scanning microscopy requires $\Omega \gg \omega$ (more precisely, $\geq 10\omega$), where $\Omega$ is the frequency of successive scans on a pixel and ω is the frequency of the sinusoidal envelope of the illumination.

FIG. 10 shows a pulsed intensity profile suitable for carrying out the invention.

The result is valid for light modulation at a single wavelength or two wavelengths. The mean light intensity perceived by a pixel is $I_i^0 = I_i^{0'} t_c/(t_c+t_d)$. The theoretical computations of the concentration and fluorescence amplitudes obtained for wide-field illumination are valid using this definition of $I_i^0$ for the mean light intensity.

In addition, light intensities delivered by a scanning microscope are stronger than in wide-field microscopy. The condition $t_c \leq \tau_{12}^0$ where $\tau_{12}^0$ depends on light intensity ensures that kinetics is controlled by photochemistry and correctly described by a two-state model. Moreover thermal steps ignored by the two-state model occur on a fast time scale $\tau^\Delta$. The time $\tau_d$ must be larger than $\tau^\Delta$ for the thermal steps to have time to relax between two pulses.

Before beginning modulation the system has to be prepared in the desired steady state associated with the mean light intensities $I_1^0$ and $I_2^0$ used during modulation. Preparation includes a series of pulses at the two wavelengths of duration $t_c \leq \tau_{12}^0$ which imposes a condition on the mean light intensities such that only fractions of 1 and 2 react during $t_c$. The pulses must by separated by a time $t_d$ larger than $\sigma^\Delta$ for the thermal steps to relax between two pulses. The number p of pulses is such that $pt_c \geq 5\tau_{12}^0$ for the steady-state to be reached. Superimposing modulation during the preparation has the same effect and has the advantage of keeping the same protocol during the entire experiment. In this case, at least the first p pulses are necessary to prepare the system in the desired steady-state.

FIG. 11 schematically represents a scanning microscope SM coupled to a data processing device such as a computer DPD which controls the light intensity profiles and processes signals representing collected light intensity by extracting the oscillating components used for detecting reversibly photoswitchable species in the sample S.

The invention is not limited to the case of a microscope—scanning or wide-field—of observing the sample. For instance, sample microscope SM may be replaced by a more general scanning optical device. For instance, WO2015/075209 describes a macroscopic scanning imaging device suitable for carrying out the OPIOM method, comprising an electro-optical modulator for modulating the intensity of a laser beam and a pair of steerable mirror for scanning a distant target, e.g. a ground surface area, with the modulated beam. The sample is supposed to contain at least one reversibly photoswitchable fluorescent species, and its fluorescence emission is remotely collected by an objective of a camera. This apparatus can easily be applied to the implementation of the inventive method.

Up to now, only the case of resonant detection—i.e. where the illumination intensities and angular frequency are selected to match the resonant condition of at least one oscillating component of an observable—have been considered. However, the amplitudes of the Fourier decomposition of the fluorescence response to light modulation constitute the kinetic footprint of a given resonant photoswitchable species, and the amplitudes which vanish far from resonance conditions also offer good discrimination properties.

For each resonant photoswitchable species two sets of experimental conditions are used. In the case of modulation at $\lambda_1$=480 nm, the first-order amplitude $\mathfrak{I}_{\mathfrak{F},\text{norm}}^{1,\text{out}}$ displays one resonance $R_1$ and the second-order amplitude $\mathfrak{I}_{\mathfrak{F},\text{norm}}^{2,\text{in}}$ has a resonance close to $R_1$ and another one, $R_2$, of weaker amplitude. The experiments give access to the out-of-phase first-order amplitudes $\mathfrak{I}_{\mathfrak{F},\text{norm}}^{1,\text{out}}$ ($R_1$) and $\mathfrak{I}_{\mathfrak{F},\text{norm}}^{1,\text{out}}$ ($R_2$), and the in-phase second-order amplitudes $\mathfrak{I}_{\mathfrak{F},\text{norm}}^{2,\text{in}}$ ($R_1$) and $\mathfrak{I}_{\mathfrak{F},\text{norm}}^{2,\text{in}}$ ($R_2$) evaluated at the resonance conditions $R_1$ and $R_2$, respectively.

It was chosen to scale the amplitudes by the non-resonant term $\mathfrak{I}_{\mathfrak{F},\text{norm}}^{1,\text{out}}$ ($R_2$) in order to eliminate their dependence on concentration, brightness, and the collection factor of the objective. In this work the kinetic footprint is reduced to the set $(l_1, l_2, l_3)$ with $l_1 = \mathfrak{I}_{\mathfrak{F},\text{norm}}^{1,\text{out}}$ ($R_1$)/$\mathfrak{I}_{\mathfrak{F},\text{norm}}^{1,\text{out}}$ ($R_2$), $l_2 = \mathfrak{I}_{\mathfrak{F},\text{norm}}^{2,\text{in}}$ ($R_1$)/$\mathfrak{I}_{\mathfrak{F},\text{norm}}^{1,\text{out}}$ ($R_2$), and $l_3 = \mathfrak{I}_{\mathfrak{F},\text{norm}}^{2,\text{in}}$ ($R_2$)/$\mathfrak{I}_{\mathfrak{F},\text{norm}}^{1,\text{out}}$ ($R_2$) in a 3-dimension space but it can be generalized to an m-dimension space if amplitudes of higher order are detectable. Theoretical computation or experiments performed for a given RSF i lead to the reference kinetic footprint $\{l_{ki}\}$ with k=1, ..., m. The kinetic footprint $M\{l_{kj}\}$ of an unknown resonant photoswitchable species j is compared to the reference i using the distance:

$$d_{ij}=\sqrt{\Sigma_{k=1}^{m}(l_{ki}-l_{kj})^2} \tag{79}$$

Discrimination between two resonant photoswitchable species is possible if their distance is larger than the cutoff distance $d_c$ imposed by the experimental accuracy $\Delta d_{ij}$ on the distance $d_{ij}$ induced by the uncertainty $\Delta l_{ki}$ on the kinetic footprint $\{l_{ki}\}$. Differentiating Eq. (79), we find $$\Delta d_{ij} = \frac{1}{d_{ij}}\sum_{k=1}^{m}|l_{ki}-l_{kj}|\Delta|l_{ki}-l_{kj}|. \tag{80}$$

Introducing the maximum uncertainty $M=\max_{k,i}(\Delta l_{ki})$ on the determination of the kinetic footprint $\{l_{ki}\}$, we have $\Delta|l_{ki}-l_{ki}|\leq 2M$. Hence Eq. (80) reads $$\Delta d_{ij}\leq 2MX \tag{81}$$

with $X^2=1+2\Sigma_{k=1}^{m}\Sigma_{k'=k+1}^{m}|l_{ki}-l_{kj}||l_{k+i}-l_{k'j}|/d_{ij}^{2}$. Regardless of the value of $|l_{ki}-l_{kj}|$, the inequality:

$$2\Sigma_{k=1}^{m}\Sigma_{k'=k+1}^{m}|l_{ki}-l_{kj}||l_{k'i}-l_{k'j}|\leq(m-1)\Sigma_{k=1}^{m}(l_{ki}-l_{kj})^2 \tag{82}$$

is observed, leading to $X\leq\sqrt{m}$. Using Eq. (81) we find $\Delta d_{ij}\leq d_c$ where the cutoff distance obeys $$d_c=2M\sqrt{m} \tag{83}$$

The cutoff distance between two resonant photoswitchable species depends on two parameters, the number m of discriminating dimensions and the uncertainty M on the determination of the kinetic footprint. An imaged RSF i is recognized as the resonant photoswitchable species j if the distance $d_{ij}$ is smaller than $d_c$.

Equation (79) only constitutes an example, and the discriminating distance may be defined otherwise.

Like resonant detection, a plurality of nonresonant measurements may be used, preferably in conjunction with a machine-learning algorithm, for estimating absolute or relative concentrations of reversibly photoswitchable species from several measurements performed in different illumination conditions.

The invention has been described with reference to a number of examples which, however, are not limiting. Different embodiments are possible; for instance, illumination at more than two wavelengths may be used; if light at more than one wavelength is modulated, different wavelengths may correspond to different modulation frequencies and/or have different phase relationships.

The invention specifically relates to a plurality of methods using harmonic components of the measured signal (i.e. components having an angular frequency n·ω with n is an integer greater than 1 and ω is the "fundamental" modulation frequency of the illuminating light), either alone or together with the fundamental component of the signal. However, it is also possible to use, in all the embodiments described above, the out-of-phase fundamental component of the signal alone, without harmonic components. In this case, use of an on-off modulation of the illuminating light may be preferred.

This is particularly interesting in the case of pulsed illumination, and more particularly of a scanning microscopy, or more generally a scanning optical device, as described above in reference to FIGS. 10 and 11.

Therefore, it is hereby disclosed a method for detecting a reversibly photoswitchable chemical species in a sample, comprising the steps of:
a) illuminating the sample with a first light at a first wavelength suitable to be absorbed by the chemical species triggering a reaction affecting at least one optical property of the chemical species, said first light being periodically-modulated at a fundamental modulation frequency;
b) measuring the evolution of the optical property of the chemical species;
c) extracting a quadrature component at the frequency of the fundamental modulation frequency of a signal representing said evolution; and
d) using the extracted component for detecting the chemical species;
wherein light is modulated by a sinusoid at the fundamental modulation frequency multiplied by a pulse train at a repetition frequency which is a multiple of, and at least ten times larger than, the fundamental modulation frequency.

According to different, advantageous embodiments of such a method:
The average intensity of the light and the fundamental modulation frequency may be chosen so to maximize the amplitude of said extracted component.
Step a) may further comprise illuminating the sample with a second light at a second wavelength, different from the first wavelength and suitable to be absorbed by the chemical species triggering said or another reaction affecting said optical property of the chemical species, said second light either having a constant intensity or being periodically modulated at the fundamental modulation frequency in phase opposition with the first light (or by a sinusoid at the fundamental modulation frequency and in phase opposition with the first light, multiplied by a pulse train at a repetition frequency which is a multiple of, and at least ten times larger than, the fundamental modulation frequency). In this case, the ratio of the average intensities of the first and second light and the fundamental modulation frequency are preferably chosen so as to maximize the amplitude of said or at least one said extracted component.
Steps a), b) and c) may be repeated a plurality of times for different illumination conditions, corresponding to different values of the light intensity or intensities and of the fundamental modulation frequency and step d) may then comprise using a plurality of signal components corresponding to said different illumination conditions for discriminating between a plurality of chemical species.
A machine learning or unmixing method may be applied to said plurality of signal components for estimating absolute or relative concentration of said chemical species.

REFERENCES

[Lakowicz 1992] J. R. Lakowicz, H. Szmacinski, K. Nowaczyk, K. W. Berndt, and M. L. Johnson. Fluorescence lifetime imaging. Anal. Biochem., 202:316-330, 1992.

[Marriott 2008] G. Marriott, S. Mao, T. Sakata, J. Ran, D. K. Jackson, C. Petchprayoon, T. J. Gomez, E. Warp, O.

Tulyathan, H. L. Aaron, E. Y. Isacoff, and Y. Yan. Optical lock-in detection imaging microscopy for contrast enhanced imaging in living cells. Proc. Natl. Acad. Sci. U.S.A., 105:17789-17794, 2008.

[Richards 2010] C. I. Richards, J.-C. Hsiang, and R. M. Dickson. Synchronously amplified fluorescence image recovery (SAFIRe). J. Phys. Chem. B, 114:660-665, 2010.

[Widengren 2010] J. Widengren. Fluorescence-based transient state monitoring for biomolecular spectroscopy and imaging. J. R. Soc. Interface, 7:1135-1144, 2010.

[Quérard 2015] J. Quérard, T.-Z. Markus, M.-A. Plamont, C. Gauron, P. Wang, A. Espagne, M. Volovitch, S. Vriz, V. Croquette, A. Gautier, T. Le Saux, and L. Jullien. Photoswitching kinetics and phase-sensitive detection add discriminative dimensions for selective fluorescence imaging. Angew. Chem. Int. Ed., 127:2671-2675, 2015.

[Quérard 2017] J. Querard, R. Zhang, Z. Kelemen, M.-A. Plamont, X. Xie, R. Chouket, I. Roemgens, Y. Korepina, S. Albright, E. Ipendey, M. Volovitch, H. L. Sladitschek, P. Neveu, L. Gissot, A. Gautier, J.-D. Faure, V. Croquette, T. Le Saux, and L. Jullien. Resonant out-of-phase fluorescence microscopy and remote imaging overcome spectral limitations. Nat. Comm., 8:969, 2017.

[Rowe 2002] H. M. Rowe, S. P. Chan, J. N. Demas, and B. A. DeGraff. Elimination of Fluorescence and Scattering Backgrounds in Luminescence Lifetime Measurements Using Gated-Phase Fluorometry, Anal. Chem. 2002, 74, 4821-4827.

[Jenkins 2015] P. Jenkins, M. A. Naivar, and J. P. Houston. Toward the measurement of multiple fluorescence lifetimes in flow cytometry: maximizing multi-harmonic content from cells and microspheres. J. Biophotonics 2015 November; 8 (11-12): 908-917.

The invention claimed is:

1. A method for detecting a reversibly photoswitchable chemical species in a sample, comprising the steps of:
   a) illuminating the sample(S) with a first light at a first wavelength suitable to be absorbed by the chemical species triggering a reaction affecting at least one optical property of the chemical species, said first light being periodically-modulated at a fundamental modulation frequency; and
   b) measuring the evolution of the optical property of the chemical species; further comprises further comprising the steps of:
   c) extracting at least one of:
      an in-phase component at a frequency which is an even multiple, different from zero, of the fundamental modulation frequency; and
      a quadrature component at a frequency which is an odd multiple of the fundamental modulation frequency, greater than the fundamental modulation frequency itself,
   of a signal representing said evolution; and
   d) using the extracted component or components for detecting the chemical species.

2. The method of claim 1, wherein the average intensity of the light and the fundamental modulation frequency are chosen so as:
   either to maximize the amplitude of said or at least one said extracted component;
   or to minimize an interfering signal, at the frequency of said or at least one said extracted component, from a different chemical species in the sample.

3. The method of claim 1, wherein step a) further comprises illuminating the sample with a second light at a second wavelength, different from the first wavelength and suitable to be absorbed by the chemical species triggering said or another reaction affecting said optical property of the chemical species, said second light having a constant intensity.

4. The method of claim 1, wherein step a) further comprises illuminating the sample with a second light at a second wavelength, different from the first wavelength and suitable to be absorbed by the chemical species triggering said or a different reaction affecting said optical property of the chemical species, said second light being periodically modulated at the fundamental modulation frequency, in phase opposition with the first light.

5. The method of claim 3, wherein the ratio of the average intensities of the first and second light and the fundamental modulation frequency are chosen so as:
   either to maximize the amplitude of said or at least one said extracted component;
   or to minimize an interfering signal, at the frequency of said or at least one said extracted component, from a different chemical species in the sample.

6. The method of claim 1, wherein steps a), b) and c) are repeated a plurality of times for different illumination conditions, corresponding to different values of the light intensity or intensities and of the fundamental modulation frequency and wherein step d) comprises using a plurality of signal components corresponding to said different illumination conditions for discriminating between a plurality of chemical species.

7. The method of claim 6, wherein step d) comprises applying a machine learning or unmixing method to said plurality of signal components for estimating absolute or relative concentration of said chemical species.

8. The method of claim 1, wherein light is modulated sinusoidally at the fundamental modulation frequency.

9. The method of claim 1, wherein light is modulated by a sinusoid at the fundamental modulation frequency multiplied by a pulse train at a repetition frequency which is a multiple of, and at least ten times larger than, the fundamental modulation frequency.

10. The method of claim 9, wherein steps a) and b) are carried out by light scanning microscopy.

11. The method of claim 1, wherein said chemical species is fluorescent and said optical property whose evolution is measured is the intensity of fluorescence emission.

12. An apparatus for carrying out a method according to claim 1, comprising:
   at least a first controlled light source (LS1) configured for illuminating a sample with a first light at a first wavelength, said first light being periodically-modulated at a fundamental modulation frequency;
   a light detector (CAM) configured for measuring the evolution of an optical property of the sample; and
   a data processing device (DPD);
   wherein the data processing device is configured for extracting at least one of an in-phase component at a frequency which is an even multiple, different from zero, of the fundamental modulation frequency and a quadrature component at a frequency which is an odd multiple, greater than the fundamental modulation frequency itself, of the fundamental modulation frequency of a signal representing said evolution; and for using the extracted component or components for detecting a chemical species in the sample.

13. The apparatus of claim 12, further comprising a second controlled light source (LS2) configured for illuminating the sample with a second light at a second wavelength, different from the first wavelength, said second light having a constant intensity.

14. The apparatus of claim 12, further comprising a second controlled light source (LS2) configured for illuminating the sample with a second light at a second wavelength, different from the first wavelength, said second light being periodically modulated at the fundamental modulation frequency, in phase opposition with the first light.

15. The apparatus of claim 12, further comprising a scanning device for illuminating the sample.

* * * * *